(12) United States Patent
Hoover et al.

(10) Patent No.: US 9,825,984 B1
(45) Date of Patent: Nov. 21, 2017

(54) BACKGROUND ANALYSIS OF WEB CONTENT

(71) Applicant: Shape Security, Inc., Palo Alto, CA (US)

(72) Inventors: Roger S. Hoover, Granite Canon, WY (US); Marc R. Hansen, Mountain View, CA (US); Justin D. Call, Santa Clara, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

(21) Appl. No.: 14/470,082

(22) Filed: Aug. 27, 2014

(51) Int. Cl.
| | |
|---|---|
| *H04L 9/00* | (2006.01) |
| *G06F 21/55* | (2013.01) |
| *G06F 21/54* | (2013.01) |
| *H04L 29/06* | (2006.01) |

(52) U.S. Cl.
CPC .......... *H04L 63/1441* (2013.01); *G06F 21/54* (2013.01); *H04L 63/145* (2013.01)

(58) Field of Classification Search
CPC .... H04L 63/145; H04L 63/1441; G06F 21/54
See application file for complete search history.

(56) References Cited

U.S. PATENT DOCUMENTS

| | | | |
|---|---|---|---|
| 6,266,684 B1 | 7/2001 | Kraus | |
| 7,401,079 B2 | 7/2008 | Itoh et al. | |
| 7,424,720 B2 | 9/2008 | Chagoly | |
| 7,475,341 B2 | 1/2009 | Malik | |
| 7,480,385 B2 | 1/2009 | Weber | |
| 7,624,173 B2 | 11/2009 | Bary et al. | |
| 7,627,562 B2 | 12/2009 | Kacmarcik et al. | |
| 7,707,223 B2 | 4/2010 | Zubenko et al. | |
| 7,836,425 B2 | 11/2010 | Rubin et al. | |
| 7,895,653 B2 | 2/2011 | Calo et al. | |
| 8,170,020 B2 | 5/2012 | Oliver et al. | |
| 8,200,958 B2 | 6/2012 | Coppola et al. | |
| 8,266,202 B1 | 9/2012 | Colton et al. | |

(Continued)

FOREIGN PATENT DOCUMENTS

| | | |
|---|---|---|
| AU | 2014237025 | 9/2014 |
| CN | 101471818 | 5/2011 |

(Continued)

OTHER PUBLICATIONS

Matsunaka, T.; Urakawa, J.; Kubota, A., "Detecting and Preventing Drive-By Download Attack via Participative Monitoring of the Web," Information Security (Asia JCIS), 2013 Eighth Asia Joint Conference, pp. 48-55 (Jul. 26, 2013).*

(Continued)

*Primary Examiner* — Theodore C Parsons

(57) ABSTRACT

A computer-implemented method includes receiving, at a primary security sub-system, code to be served from a web server system to one or more computing devices; forwarding a representation of the code to a secondary security sub-system that is remote from the primary security sub-system; receiving, from the secondary sub-system and in response to the forwarding, a template created from analysis of the representation of the code that indicates changes to be made to the code and locations of the changes; and using the template to recode the code, by the primary security sub-system, before serving the code to the one or more computing devices.

20 Claims, 7 Drawing Sheets

(56) References Cited

U.S. PATENT DOCUMENTS

| | | | |
|---|---|---|---|
| 8,533,613 B2 | 9/2013 | Yu | |
| 8,555,388 B1 | 10/2013 | Wang et al. | |
| 8,584,233 B1* | 11/2013 | Yang | G06F 21/51 709/229 |
| 8,595,703 B2 | 11/2013 | van Gogh et al. | |
| 8,601,064 B1 | 12/2013 | Liao | |
| 8,639,743 B1 | 1/2014 | Colton et al. | |
| 8,752,035 B2 | 6/2014 | Fanning et al. | |
| 8,756,685 B2 | 6/2014 | Jeong et al. | |
| 8,806,627 B1 | 8/2014 | Aharoni | |
| 8,954,583 B1 | 2/2015 | Zhou | |
| 8,997,226 B1 | 3/2015 | Call | |
| 9,075,990 B1 | 7/2015 | Yang | |
| 9,104,878 B1 | 8/2015 | Khairetdinov | |
| 9,225,729 B1 | 12/2015 | Moen | |
| 9,225,737 B2 | 12/2015 | Call | |
| 9,275,222 B2 | 3/2016 | Yang | |
| 9,456,050 B1 | 9/2016 | Lepeska | |
| 9,563,929 B1 | 2/2017 | Sokolowski | |
| 9,609,006 B2 | 3/2017 | Call | |
| 2003/0005129 A1 | 1/2003 | Scheinkman | |
| 2004/0162994 A1 | 8/2004 | Cohen | |
| 2005/0172338 A1 | 8/2005 | Sandu | |
| 2005/0198099 A1 | 9/2005 | Motsinger | |
| 2005/0204348 A1 | 9/2005 | Horning | |
| 2005/0216770 A1 | 9/2005 | Rowett | |
| 2005/0278627 A1 | 12/2005 | Malik | |
| 2006/0015941 A1* | 1/2006 | McKenna | G06F 21/55 726/23 |
| 2006/0212932 A1 | 9/2006 | Patrick | |
| 2006/0230100 A1 | 10/2006 | Shin et al. | |
| 2006/0230288 A1 | 10/2006 | Fox | |
| 2007/0011295 A1 | 1/2007 | Hansen | |
| 2007/0083933 A1 | 4/2007 | Venkatapathy | |
| 2007/0245027 A1 | 10/2007 | Ghosh | |
| 2008/0222736 A1 | 9/2008 | Boodaei et al. | |
| 2008/0250310 A1 | 10/2008 | Chen | |
| 2009/0070459 A1 | 3/2009 | Cho et al. | |
| 2009/0099988 A1 | 4/2009 | Stokes et al. | |
| 2009/0193497 A1* | 7/2009 | Kikuchi | G06F 21/54 726/1 |
| 2009/0216882 A1 | 8/2009 | Britton | |
| 2009/0241174 A1 | 9/2009 | Rajan et al. | |
| 2009/0249310 A1 | 10/2009 | Meijer et al. | |
| 2009/0292791 A1 | 11/2009 | Livshits | |
| 2010/0088404 A1 | 4/2010 | Mani | |
| 2010/0100927 A1 | 4/2010 | Bhola et al. | |
| 2010/0106611 A1 | 4/2010 | Paulsen | |
| 2010/0142382 A1 | 6/2010 | Jungck et al. | |
| 2010/0218253 A1 | 8/2010 | Andrew | |
| 2010/0235636 A1 | 9/2010 | Cohen | |
| 2010/0257354 A1 | 10/2010 | Johnston et al. | |
| 2010/0319070 A1 | 12/2010 | Born | |
| 2010/0332993 A1 | 12/2010 | Bousseton et al. | |
| 2011/0154473 A1 | 6/2011 | Anderson | |
| 2011/0173526 A1 | 7/2011 | Schwarzbauer | |
| 2011/0231305 A1 | 9/2011 | Winters | |
| 2011/0255689 A1 | 10/2011 | Bolotov | |
| 2011/0296391 A1 | 12/2011 | Gass et al. | |
| 2011/0307951 A1 | 12/2011 | Yermakov et al. | |
| 2011/0320816 A1 | 12/2011 | Yao et al. | |
| 2012/0022942 A1 | 1/2012 | Holloway | |
| 2012/0096116 A1 | 4/2012 | Mislove et al. | |
| 2012/0159193 A1 | 6/2012 | Spradlin et al. | |
| 2012/0198528 A1 | 8/2012 | Baumhof | |
| 2012/0254727 A1 | 10/2012 | Jain | |
| 2012/0255006 A1* | 10/2012 | Aly | H04L 63/168 726/23 |
| 2013/0031037 A1 | 1/2013 | Brandt | |
| 2013/0091582 A1 | 4/2013 | Chen et al. | |
| 2013/0198607 A1 | 8/2013 | Mischook et al. | |
| 2013/0227078 A1 | 8/2013 | Wei et al. | |
| 2013/0238975 A1 | 9/2013 | Chan et al. | |
| 2013/0273882 A1 | 10/2013 | Walsh | |
| 2014/0040051 A1 | 2/2014 | Joseph Ovick | |
| 2014/0089786 A1 | 3/2014 | Hashmi | |
| 2014/0289830 A1 | 9/2014 | Lemaster | |
| 2014/0310392 A1 | 10/2014 | Ho | |
| 2014/0379902 A1 | 12/2014 | Wan | |
| 2015/0058992 A1 | 2/2015 | El-Moussa | |
| 2015/0067031 A1 | 3/2015 | Acharya | |
| 2015/0067853 A1* | 3/2015 | Amrutkar | H04L 63/14 726/23 |
| 2015/0235362 A1 | 8/2015 | Ghosh | |
| 2015/0256556 A1 | 9/2015 | Kaminsky | |
| 2015/0262183 A1 | 9/2015 | Gervais | |
| 2015/0341385 A1 | 11/2015 | Sivan | |
| 2015/0378876 A1 | 12/2015 | Ji | |
| 2016/0005029 A1 | 1/2016 | Henry | |
| 2016/0119344 A1 | 4/2016 | dos Santos | |
| 2016/0191351 A1 | 6/2016 | Smith | |
| 2016/0344769 A1 | 11/2016 | Li | |
| 2016/0359901 A1 | 12/2016 | Yang | |
| 2017/0012960 A1 | 1/2017 | Idika | |
| 2017/0013012 A1 | 1/2017 | Hansen | |
| 2017/0063923 A1 | 3/2017 | Yang | |
| 2017/0118241 A1 | 4/2017 | Call | |

FOREIGN PATENT DOCUMENTS

| | | |
|---|---|---|
| EP | 14730229 | 5/2017 |
| GB | 2443093 A | 4/2008 |
| WO | WO2000/72119 | 11/2000 |
| WO | WO2002/093369 | 11/2002 |
| WO | WO2010/046314 | 4/2010 |
| WO | WO 2013/091709 | 6/2013 |
| WO | WO 2017/007705 | 1/2017 |
| WO | WO 2017/007936 | 1/2017 |
| WO | 2017/040453 | 3/2017 |
| WO | WO 2017/074622 | 5/2017 |

OTHER PUBLICATIONS

Pattabiraman and Zorn, "DoDOM: Leveraging DOM Invariants for Web 2.0 Application Robustness Testing," 2010 IEEE 21st International Symposium on Software Reliability Engineering, pp. 191-200.

Rieck et al. "Cujo: Efficient Detection and Prevention of Drive-by-Download Attacks," ACSAC 2010, Austin, Texas, Dec. 6-10, 9 pages.

Zhou, U.S. Appl. No. 15/157,704, filed May 18, 2016, Office Action, Oct. 6, 2016.

Sirer, et al., "Design and implementation of a distributed virtual machine for networked computers"; ACM SIGOPS Operating Systems, 1999, p. 202-216; 15 pages, 1999, 15.

In-the-wire authentication: Protecting client-side critical data fields in secure network transactions,Jan. 14, 2009.

WebShield: Enabling various web defense techniques without client side modifications,Feb. 6, 2011.

Detecting and Preventing Drive-By Download Attack via Participative Monitoring of the Web, Jul. 23, 2013.

On-the-fly web content integrity check boosts users' confidence, Nov. 1, 2002.

In Search of an Understandable Consensus Algorithm, 2014 USENIX Annual Technical Conference, Jun. 19, 2014, 305-319, Proceedings of USENIX Annual Technical Conference 2014, USENIX.

In Search of an Understandable Consensus Algorithm (Extended Version), May 20, 2014.

International Preliminary Report on Patentability, dated Jun. 16, 2016, PCT/US14/68133, Shape Docket No. SH-0000049-002-PCT.

International Search Report, dated Apr. 7, 2015, PCT/US14/68133, Shape Docket No. SH-0000049-002-PCT.

International Search Report, dated Jul. 28, 2015, PCT/US15/31361, Shape Docket No. SH-0000014-003-PCT.

International Search Report, dated Apr. 9, 2015, PCT/US15/12072, Shape Docket No. SH-0000050-002-PCT.

International Preliminary Report on Patentability, dated Nov. 30, 2015, PCT/US15/12072, Shape Docket No. SH-0000050-002-PCT.

(56) References Cited

OTHER PUBLICATIONS

International Search Report, dated Jan. 21, 2015, PCT/US14/23635, Shape Docket No. SH-0000001-008-PCT.
International Search Report, dated Sep. 22, 2016 PCT/US16/40645, Shape Docket No. SH-0000030-003-PCT.
International Search Report, dated Feb. 16, 2017, PCT/US16/53472, Shape Docket No. SH-0000029-002-PCT.
International Search Report, dated Dec. 30, 2016, PCT/US16/53392, Shape Docket No. SH-0000021-002-PCT.
International Search Report, dated Nov. 21, 2016, PCT/US16/49357, Shape Docket No. SH-0000022-002-PCT.
International Search Report, dated Oct. 11, 2016, PCT/US16/41337, Shape Docket No. SH-0000027-003-PCT.
International Search Report, dated Aug. 14, 2014, PCT/US14/27805, Shape Docket No. SH-0000004-004-PCT.
International Search Report, dated Aug. 1, 2014, PCT/US14/24232, Shape Docket No. SH-0000002-004-PCT.
International Search Report, dated Jul. 18, 2014, PCT/US14/23897, Shape Docket No. SH-0000003-004-PCT.

* cited by examiner

BACKGROUND ANALYSIS OF WEB CONTENT

TECHNICAL FIELD

This document relates to systems and techniques for interfering with the operation of computer malware, as a mechanism to improving computer system security.

BACKGROUND

Much of our commerce now occurs in the form of ecommerce, through computer users who access services over the Internet and the World Wide Web. Because this commerce involves money, it draws unsavory characters to its periphery—in the form of fraudsters. The aim of these people is to intercept or otherwise interfere with the activities of legitimate commerce so as to identify confidential information like account numbers, passwords, user IDs, and the like, as a mechanism toward stealing money from such users or from the organizations that provide services to such users. For example, through a technique known as a "Man in the Browser" attack, malware may be loaded on a client computer and may attempt to intercept information such as account numbers and passwords when a user interacts with a banking site, or passwords and credit card information when the user interacts with an on-line retail store.

Various approaches have been taken to identify and prevent such malicious activity. For example, some approaches install defensive software on client computers, while others install certain types of security software on receiving computer server systems (e.g., firewalls for a corporation).

SUMMARY

This document describes systems and techniques by which web code (e.g., HTML, CSS, and JavaScript) is modified before it is served over the internet by a server system so as to make more difficult the exploitation of the server system by clients (e.g., various computers such as desktops, laptops, tablets, and smartphones) that receive the code (including clients that are infected by malware without their users' knowledge). In certain implementations discussed below, an intermediary system may work at multiple levels to help analyze web code that is served or is to be served, so as to generate templates, or maps, for guiding polymorphic serving of such code. Code is served polymorphically when the underlying code is different each time it is served, but its outward functioning does not change with the changes to the code. As a simple example, a particular function name may be changed to a different name every time the code is served, and such change may be made each time consistently throughout the different types of code that are served and for each instance of the function name in the code. Such polymorphic changes create a moving target for malware that may be attempting to analyze or interact with the code for malicious purposes, by analyzing code from one serving and then attacking in a subsequent serving of the code.

As described below, the multiple-level analysis of the code before it is served may be used to identify the types of countermeasures to be inserted into the code so as to interfere with malware. Certain countermeasures may be easier to insert into the code, but may provide less protection than do other countermeasures. As described in more detail below, a front-line system (a first level of analysis) may be provided to a customer of a security system, such as in the form of a rack-mounted box, and may perform polymorphic modification of code that is served. Along with such modification, the box may also perform limited analysis of the code to identify countermeasures, including polymorphic countermeasures, to be applied to the code.

Such a front-line, or first-level, device may also determine that other types of analysis for the code would be better carried out by a different device (a second level of analysis), such as a more capable device operated by the company that provides the security services. The other device may be more capable because it has greater processing power and can thus perform more complex analysis (e.g., it is a large system of analysis servers). It may also be more capable because it is not burdened with separately handling the conversion, or transcoding, of the code for the particular customer, which may have to be repeated many times for a single analysis of the code. Furthermore, such a device may be more capable because it may have access to a greater level of data than does the local front-line device at the customer. For example, a central system may have access to data from multiple different customers that serve different forms of web code, and to data on many more potential attacks on that code by malware. The central second-line system may thus analyze that deeper and more diverse set of data to develop, identify, and select appropriate countermeasures and to configure the selected countermeasures in a manner that maximizes the security for its various customers, while maintaining confidentiality for each of the customers.

A front-line analyzer that is local to the original web server that serves the code may determine to seek assistance from a central, or secondary, analyzer in a variety of situations. For example, a local analyzer may forward code every time the code is determined to have changed—so that the secondary analyzer is, in effect, the only analyzer. As another example, a developer of the code may annotate the code with a tag or other marker that indicates whether centralized analysis of the code is desired or not, and the local analyzer may use such an indicator to decide whether to perform only local analysis or to also seek central analysis. In addition, the local analyzer may observe how popular particular pages are, and may forward them for more-complete central analysis if they become high in popularity. Additionally or alternatively, a system may seek extra analysis where anomalous behavior with the served code has been observed at clients, indicating that malware is attempting to interact with the served code on the clients. And also, code may be forwarded for additional analysis when a local analyzer determines that the code includes characteristics that are amenable to centralized analysis but not to local analysis (e.g., the code includes particular types of sub-parts that can be readily recognized as benefitting from centralized analysis).

Thus, as described above and below, a device local to a web serving system may forward information, including the served web code, to a central analysis system, which may perform additional analysis that is not currently practical or possible to be performed at the local device, or sub-system. The central analysis system may then return information, such as a map, or template, to be used by the local analyzer in performing modification of the code through the use of a variety of different countermeasures, including countermeasures that provide for polymorphic serving of the code.

Such techniques and systems may, in certain implementations, provide one or more advantages. For example, components of a system may be made more specialized, so that certain components perform only transcoding (or transcoding with limited analysis) while other components perform only analysis, and perhaps only higher-end analysis. As a result, each such component may be made more effective and efficient in the limited tasks it is asked to perform. Also, such sharing of analysis burden may better permit a system to load balance, so that transcoders can pass on a portion of their analysis responsibilities when they begin to be loaded down with processing tasks. Also, analysis may be performed by a system that is better arranged to perform the analysis, either because it has far greater processing power (or perhaps analysis-dedicated processors), better and more up-to-date software for performing the analysis, the presence of human operators to assist in the analysis, and/or access to more and better data about the sort of transcoding is most effective in certain situations. As an additional possible advantage, a central system may the ability to test certain analysis results across a relatively large and diverse population of end-user devices, such as by adding monitoring instrumentation code that is to be served to client devices along with web code from various different organizations, and monitor the activity of such devices when no security measures are added to the code, and when particular different security measures are added to the code.

In one implementation, a computer-implemented method is disclosed that comprises receiving, at a primary security sub-system, code to be served from a web server system to one or more computing devices; forwarding a representation of the code to a secondary security sub-system that is remote from the primary security sub-system; receiving, from the secondary sub-system and in response to the forwarding, a template created from analysis of the representation of the code that indicates changes to be made to the code and locations of the changes; and using the template to recode the code, by the primary security sub-system, before serving the code to the one or more computing devices. The method can also include, before forwarding the representation of the code, determining whether to forward the representation of the code based at least in part on an initial analysis of the code by the primary security sub-system. The initial analysis can comprise determining that analyses for types of transformations for the code are best performed by the secondary security sub-system, and/or determining whether the code is requested sufficiently frequently by users, and forwarding the representation of the code in response to determining that the code is requested sufficiently frequently. The initial analysis can also comprise determining whether the code is susceptible to introduction of security countermeasures that cannot be practically introduced without assistance from the secondary security sub-system.

In some aspects, the primary security sub-system comprises hardware and software operated within a network of an organization that serves the code, and the secondary security sub-system comprises a server system operated by a security services organization for which the organization that serves the code is one of a plurality of customers that receive security services offered by the secondary security sub-system. The template can be generated using information from organizations other than an organization that generated the code. Also, the method can comprise providing code to particular ones of the one or more computing devices by replacing content in the code at places identified by the template, wherein the replacing differs as between different instances in which the code is provided to the particular ones of the computing devices. In yet other examples, the method also includes supplementing the code with instrumentation code arranged to execute on particular ones of the one or more computing devices and to report to an operator of the primary security sub-system, an operator of the secondary security sub-system, or both, occurrences of anomalous activity on the particular ones of the one or more computing devices.

In one or more other aspects, the method also comprises serving to particular ones of the one or more computing devices the instrumentation code with a transcoded version of the code created by applying the received template to the code. The method can further comprise creating one of more security countermeasures with the primary security sub-system and adding one or more additional security countermeasures received from the secondary security sub-system; and providing to particular ones of the one or more computing devices the code as modified to include the one or more security countermeasures and the one or more additional security countermeasures.

In another implementation, a computer-implemented data security system is disclosed. The system comprises one or more first computing devices programmed to identify a need for assistance in analyzing electronic resources to be served to client devices, the analyzing including identifying locations at which the electronic resources can be altered before being served to the computing device without affecting functionality of the electronic resources; and one or more second computing devices that are located remotely from the one or more first computing devices, and are programmed to perform the analyzing of the electronic resources and to return, to a sub-system containing the one or more first computing devices, one or more templates for processing the electronic resources to create countermeasures against malware interaction with the electronic resources, wherein the one or more first computing devices are programmed to forwarded data that corresponds to the electronic resources to the one or more second computing devices when a need for assistance in analyzing the electronic resources is identified. The one or more first computing devices can be programmed to, before forwarding a representation of the electronic resources, determine whether to forward the representation of the electronic resources based at least in part on an initial analysis of the code by the primary security sub-system. Moreover, identifying a need for assistance can comprise determining that analyses for types of transformations for the electronic resources are best performed by the second computing devices. Also, identifying a need for assistance can comprise determining whether the electronic resources are requested sufficiently frequently by users. In addition, the first computing devices can be further programmed to supplement the electronic resources with instrumentation code arranged to execute on particular ones of the client devices and to report to an operator of the second computing devices occurrences of anomalous activity on the particular ones of the client devices. Finally, the subsystem containing the first computing devices can be programmed to serve the instrumentation code with a transcoded version of the electronic resources created by applying the received templates to the electronic resources.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Described below are systems and techniques for deflecting and detecting malware activity on client devices to which a server system serves computer code. Generally, the techniques allow analysis of resources that are to be served by a system to be performed by an appropriate set of components within an overall system, such as by allowing a component that has limited available processing power or limited access to relevant data, to offload analysis of the resources to other components that have additional processing power or additional access to data. For example, a security services organization may contract with a number of web content providers to provide to them transcoding of the code that they serve to client devices, where such transcoding is aimed at interfering with the ability of malware to interact with the served code. The security services organization may provide to such customers hardware and/or software that monitors the flow of served code from the respective customer and determines when off-site analysis of the code is needed. For example, a rack-mounted box may be provided for transcoding the served code, and may identify when a new webpage has been added to a customer's site. Upon detecting the presence of new code (or sufficient changes to prior versions of code), the box may perform limited analysis of the code to determine whether it should receive off-site analysis for transcoding. As just a few examples of such limited analysis, the box may determine whether the code includes structures that are amenable to off-site analysis, whether the code has reached a sufficient level of popularity to warrant such off-site analysis (because increased numbers of serving also increase the malware threat level), and/or whether the code has suffered attack or is likely to suffer attack such that sophisticated analysis of the code for transcoding in order to impose security countermeasures on the code would be a worthwhile proposition.

Figure 1A:
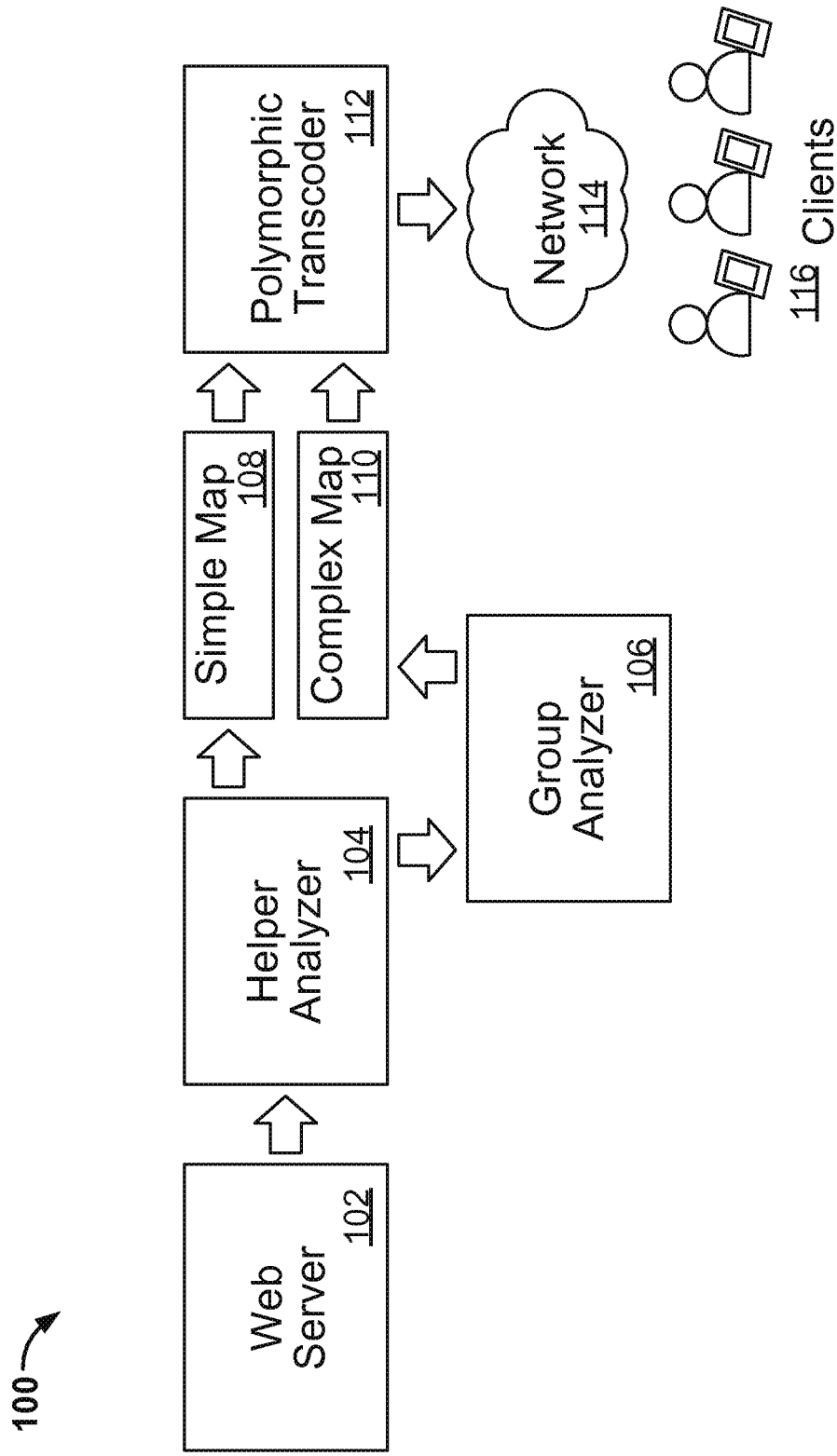
FIG. 1A is a conceptual diagram of a system for analyzing and transcoding web code via multiple sub-systems.

FIG. 1A is a conceptual diagram of a system 100 for analyzing and transcoding web code via multiple subsystems. In general, the system 100 includes components for assisting an operator of a website in introducing electronic security countermeasures into its code that it serves to various client devices, such as desktop computers, laptops, tablets, and smartphones. The components perform such assistance by transcoding the resources served by a Web server 102 or other appropriate server system, such as by transcoding the resources in a different manner every time they are served. As one such example, various variable or function names may be changed every time the code is served and such changing will not break the code as long as the changes are made consistently across all of the code in a particular serving of the code. The changes may include replacing names of variables and functions with essentially random strings of characters, where "randomness" is judged by an ability of the changes to interfere with attempts by malware to predict what the names will be.

Such transcoding generally requires certain components to analyze the resources that are to be served, so as to identify elements within the resources (e.g., different types of executable code such as HTML, CSS, and JavaScript) that can be changed as part of the transcoding process, and to find the various instances of an element that is to be changed (so that changes can be made consistently across the code). Such analysis may range from the very simple to the highly complex. Simple analysis may be performed with limited computing resources and limited analytical sophistication. Complex analysis may require extensive computing resources and access to extensive data, such as data that indicates styles of coding across multiple different websites and development groups, information about transcoding analysis and countermeasures that were successful or unsuccessful in prior attempts to deploy countermeasures, and information about historic and current malware activity across one or more internet domains into which various organizations serve their web content.

The serving of resources in this example begins with a Web server 102, which may take a variety of forms and may include multiple interconnected Web servers operated by small to large organizations. For example, Web server 102 may represent dozens or hundreds of separate servers along with their interrelated load balancers, communication servers, and other hardware and software needed to operate a sophisticated Internet-based enterprise. Such hardware and software is simplified here into a single Web server 102 for visual clarity.

A helper analyzer 104 communicates with the Web server 102, and may serve as an intermediary between the Web server 102 and a network 114 through which the Web server 102 serves its code. For example, when a client device 116 requests resources through network 114 from Web server 102, the helper analyzer 104 may intercept such a request and may also intercept the serving of code in response to such a request. The helper analyzer 104 may be part of a larger and more complete security subsystem that is provided to an organization that operates Web server 102. Such a subsystem may include hardware and/or software for performing a number of security-related services for such an organization. For example, the subsystem may include a physical rack-mounted component that is provided to the organization for inclusion into its network, as an intermediary between the traditional components operated by the customer and the Internet. In other implementations, the subsystem may be part of a cloud implementation to which the Web server 102 points for assistance with security-related operations.

The helper analyzer 104 parses the code from the Web server 102 and performs basic analysis of the code, and also determines whether external analysis would be helpful and needed. The helper analyzer 104 may be capable of only simple analysis such as basic substitutions of fixed elements in the code, which may simply involve identifying particular tags and flagging elements that appear positionally relative to those tags according to a known programming syntax. The helper analyzer 104 may also be capable of more complex forms of analysis, but may, in particular situations, prefer to offload certain forms of analysis, such as when Web server 102 is highly loaded and passing large amounts of code through the security subsystem that includes the helper analyzer 104. The helper analyzer 104 may be triggered to make such a determination that analysis is needed upon determining that the particular code is new, such as by the code having never been received before or by having been updated in a substantive manner. Such determination may occur by the Web server 102 attempting to serve the code, and the helper analyzer 104 or related components comparing the code to previously served code (and seeing no match), by the Web server 102 attempting to serve the code and providing information to the helper analyzer 104 to indicate that the code has been changed or is new (e.g., with some indicator in a passage marked as a comment, which the helper analyzer 104 may be programmed to recognize as an actionable annotation, and more than a mere comment to be ignored), or by the Web server 102 providing the code to the helper analyzer 104 before any request for the code has been made, so that such determination about a need for analysis may be made in advance of a need to actually serve the code. For example, each time the Web server 102 receives "new" code, it can pass the code via special API to the helper analyzer 104, and the use of such API may be an indication to the helper analyzer 104 that it is to analyze the content to determine security countermeasures that can be applied to the content, and to determine what components of the security system 100 should perform the analysis.

Where the helper analyzer 104 is able to perform analysis of the code, it may generate a simple map 108, or template, as a result of such analysis. The simple map 108 may include pointers to locations in the code to indicate where changes should be made to the code for each serving of the code in which it is trans-coded. The simple map 108 may also include meta-data that indicates the type of transformations that are to be performed to the code. For example, the simple map 108 may identify every location throughout the code (including different HTML, CSS, and JavaScript files) at which a particular function name occurs, and an indication that the function name is to be replaced with a random set of characters having a particular string length. Such a simple map 108 may then be used by a polymorphic transcoder 112 to transcode the initial code that was provided by the Web server 102, polymorphically for serving such code over the network 114 to a requesting client device 116.

In certain instances, the simple map 108 (meaning a map generated by relatively simple analysis, though the nature of the resulting map may be simple or complex based on the content) may be determined by the system 100 to be sufficient for all serving of the code. In other situations, the simple map 108 may be generated and may be used until a more complex map 110 is determined to be needed (meaning a map generated from more complex analysis), and can be obtained. In yet other implementations, no simple map 108 may be prepared at all, and the only transcoding performed on the code may occur by use of a complex map 110. In short, an initial analysis may determine that primary analyzer should be employed, a secondary analyzer should be employed, or both should be employed (and the results of the analyses used sequentially or concurrently). The content can also be served without modification at all, or at least without modification for a short period, if it is determined that either of the analyses (either the primary, simple analysis, or the secondary, more complex analysis) cannot be performed satisfactorily—either in terms of rendering a satisfactory level of security or in terms of being analyzed fast enough to provide for adequate system performance. For example, if primary analysis cannot be completed, code may be served without modification to all requesters until a map is received back from a source of secondary analysis. Also, the secondary analysis system can return to the primary analysis system data indicating how long the analysis is expected to take, or whether such analysis can currently be completed, and the primary analysis system may make a decision about whether to have the code served without modification, to serve with simple analysis, or to undertake its own complex analysis before serving the code (or to serve without the benefit of complex analysis until such analysis can be completed, and then to serve with a complex map after that). Thus, a system may have a variety of levels of "fallbacks" if resources are not currently available, and/or the code presents a particular analytical challenge.

Where helper analyzer 104 determines that analysis beyond that which it can provide (or can currently provide) is needed, it may refer the analysis to group analyzer 106. In typical situations, group analyzer 106 will be operated by a central security organization that is separate from the organization that operates Web server 102, or perhaps by a single large organization that has many web properties and provides its own security services. Certain benefits of such centralized analysis include the ability to use specialized and dedicated analysis hardware and software, including in the form of application-specific integrated circuits (ASICs) and also to access data to assist in the analysis where the data may span across many different web properties, and thus may take into account diversity in the form of coding and in the form of attacks that take place on such code.

Centralized analysis shared across many different web sites may also provide additional benefits in appropriate implementations. For example, results of analyzes may be re-used between different organizations and domains, and exact results can be re-used when different organizations serve the same or almost the page (e.g., the same for all elements that receive polymorphic treatment). Shared elements may also be used as between different organizations and domains that serve code, such as certain libraries or shared content that would only need to be analyzed once rather than repeatedly. Also, some analysis may require a large amount of computing resources that would be unavailable at the primary devices; such computationally-expensive analysis could be performed once across devices and made available for code coming from many different devices. Also, even where the secondary analysis is performed locally to a particular provider, the transformation subsystem may be optimized for transformation and perhaps simple analysis, whereas the secondary analyzers may be optimized for that task—where the optimization may involve deploying different hardware and software for each subsystem, as compared to the other system (e.g., using ASICs programmed specially for analysis, on the one hand, or for transformation, on the other hand). Moreover, by modularizing the tasks as between different systems, appropriate balance between cost and reliability may be achieved, as primary systems generally need to exhibit near-perfect reliability while secondary systems do not. Also, where secondary analysis need not be accomplished immediately, it may be delayed (whether performed on the primary system or the secondary system) until resources are available—whether in terms of seconds of delay or hours of delay (e.g., performing analysis during nighttime when user loads on a system may be lower).

In referring a job to the group analyzer 106, the helper analyzer 104 may pass a representation of the code to be analyzed, including all or part of the code itself in the form it was received from the Web server 102, and may wait for a corresponding response from the group analyzer 106. Additional information may also be passed to the group analyzer 106, including information about analysis that has been done or will be done by the helper analyzer 104, so that the group analyzer 106 may have the benefit of initial data generated by the helper analyzer 104 and may also avoid performing analysis that the helper analyzer 104 is already performing or will perform.

If the group analyzer 106 has resources available for performing the analysis, it may begin the analysis immediately and pass the results of the analysis back to the local security subsystem. The results of such analysis may include a complex map 110 that may be formatted similarly to the simple map 108, though may include the results of the presumably-more-complex analysis that is performed by the group analyzer 106. Thus, simple map 108 and complex map 110 may both be used by the polymorphic transcoder 112 in its actions to replace content in the code that is provided by the Web server 102 before serving such code over the network 114. In a very simplified expression, the maps 108 and 110 may be considered as tools that allow the polymorphic transcoder 112 to simply perform a cut-and-paste action of relatively low computational complexity, so that it may be performed many times for the many servings of the code as compared to the relatively fewer times that the code will be analyzed (once each time it changes in a substantive way).

In certain situations, there may be a delay before results are received back from the group analyzer 106. Where such delay is acceptable to a user who is requesting content from the Web server 102, the polymorphic transcoder 112 can simply wait to receive the data back, and the transcode the relevant served resources. In other situations, the particular request may be served without any transcoding, or simply with the transcoding provided from the simple map 108. Subsequent requests that are received before information is received back from the group analyzer 106 may be provided with responses in a similar manner. When the data from analysis is received back from the group analyzer 106, any later requests may be served with the transformations enabled by such complex map 110. In certain implementations, requests may be trans-coded using a combination of the simple map 108 and the complex map 110 after data for the complex map 110 is received. In other implementations, the simple map 108 may be removed from service once the complex map 110 is obtained from the group analyzer 106.

In some implementations, the group analyzer 106 may provide information back to the local security subsystem regarding analysis that has not yet been performed. For example, when the group analyzer 106 receives a request, it may provide a response that indicates an approximate amount of time that it expects to need in order to perform the analysis. The group analyzer 106 may also provide an indication that it cannot currently perform the analysis, and may ask the local security subsystem to identify what it would like the group analyzer 106 to do in such a situation. For example, the helper analyzer 104 may initially refer a job to the group analyzer 106 and not intend to perform its own analysis, but may subsequently receive a response from the group analyzer 106 indicating that the group analyzer 106 cannot currently perform the analysis. In such a situation, the helper analyzer 104 may determine to perform its own simple analysis that it would not have performed at all if the group analyzer 106 had not been currently burdened.

In this manner, then, the system 100 may provide an efficient and modularized approach to transcoding of served content and the analysis of such served content for purposes of performing such transcoding. Resources may be provided at customer sites (or dedicated to customer domains when implemented in a hosted cloud environment) and may be supplemented by central resources that are dedicated to performing analysis for security-directed transcoding, and perhaps are shared as between many customers. The modular approach may also be flexible, in that the local components may be provided with decision-making authority regarding when referrals will be made to a central subsystem, and may operate in the absence of assistance and also with assistance (though perhaps may operate more effectively when the assistance is provided).

Figure 1B:
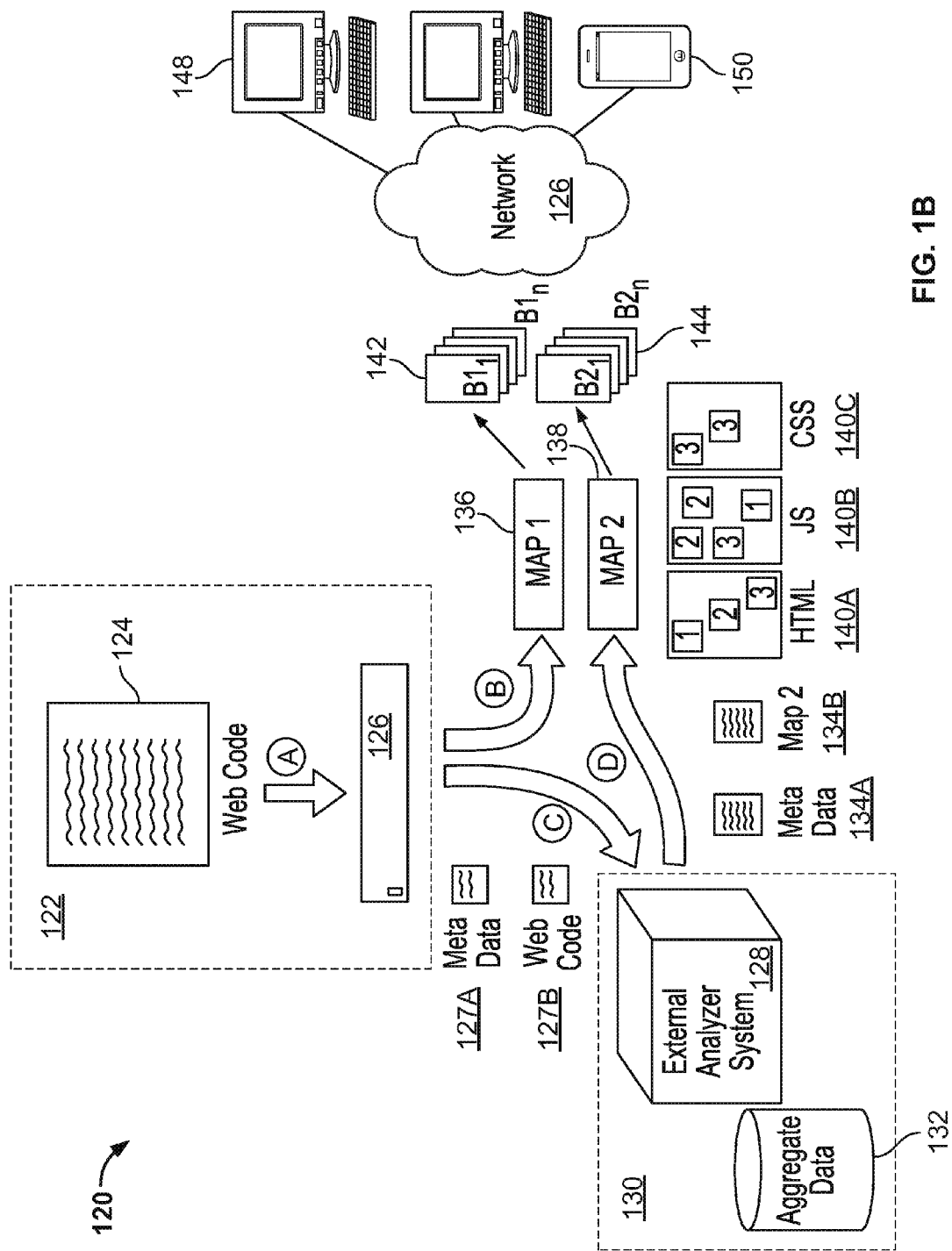
FIG. 1B is a conceptual diagram showing information flow in a system for analyzing and transcoding web code.

FIG. 1B is a conceptual diagram showing information flow in a system 120 for analyzing and transcoding web code. The system 120 may be similar to the system 100 just discussed in FIG. 1A, though is shown in more detail here, both in terms of the components of the system 120 and in terms of the process flow for the system 120.

The system 120 generally includes a primary security subsystem 122, a secondary security subsystem 130, and a network 126, and clients 148 and 150 through which, and to whom, electronic resources are served by the system 120. The primary security subsystem 122 is generally located local to a server system that is serving the relevant code, and first receives the code and controls the sort of analysis that will be performed on the code. The secondary security subsystem 130 is generally located remotely from the primary security subsystem 122 and the Web servers that served the code, and acts to perform analysis when such analysis is requested. The secondary security subsystem 130 may also provide additional services that may be needed for enabling security for the served resources, such as by providing instrumentation code that can be served along with the trans-coded code. Such instrumentation code, as described in more detail below, may execute on the client devices 148 and 150 to monitor interaction between the served code as it is executing on such devices 148 and 150, and other code on the devices such as malware. Such instrumentation code may identify anomalous activity such as by monitoring a document object model (DOM) for a Web browser on the particular devices 148 and 150. Such anomalous activity may include third-party code making a request that includes a function name or variable name that was part of the base code but that has since been replaced as part of a transcoding process, where such reference to a "old" name by third-party code on a client device tips off the third-party code as being potential malware.

Instrumentation code may also be added to the web code that is served to client devices 148 to 150 in order to better understand how the web code is operating on particular devices, and potentially how malware is operating on those devices, including how the malware is trying to exploit the web code. The instrumentation code may be code that supplements the web code and is served to particular clients with corresponding web code, and that executes on the client to monitor for the occurrence of various activities on the client devices. For example, if a security system changes the names of functions in the web code, the instrumentation code may monitor for external software that makes a call on the "old"/original function name, as that may indicate malware that is improperly trying to exploit the web code without knowing that the web code has been recoded.

Where a central system provides the instrumentation code for addition to web code served by many different organizations, the aggregate data returned by the instrumentation code may be particularly useful, and the ability of the central system to perform experiments with the instrumentation code may be particularly powerful. The data may be particularly useful because it may represent attempted exploits across a diverse array of clients served a diverse array of web code, so that greater variation in the data may be seen, and more conclusions may be made by an analysis system about the data and the malware out in the served ecosystem. The ability to experiment may be greater, because the central system can provide different security countermeasures to different clients, different groups of clients (e.g., try each of X different countermeasures with a group of clients that are served by each of particular organizations that subscribe with a security service), and different customers. The different response that are seen by the instrumentation code as corresponding to the different attempted security measures may be used by a central analysis system to identify which countermeasures or groups of countermeasures are most effective in particular situations—and to roll those countermeasures out to other domains as soon as a particular attack is identify on that domain (and before a countermeasure could be developed if the system were only serving that one domain).

The primary security subsystem 120 is shown implemented with a web appliance 126 (whether a physical appliance, such as mounted in a server rack, or a virtual appliance, such as implemented in a large data center with other applications or as part of a software-as-a-service implementation), which may take the form of a rack-mounted electronic box 126 that is programmed with appropriate security software or firmware. The box 126 may receive web code 124 as shown by arrow A, such as by the web code being passed to the box 126 by a Web server system of a customer of a security service provider. As shown by arrow B, the box 126 may analyze the web code 124 for purposes of instituting countermeasures by way of recoding the web code 124. Such analysis may result in the creation of MAP 1, designated as 136. Such a map, as discussed above, may define locations in the web code 124 at which the code is to be changed when it is served, relative to its original form. Such a map may also identify manners in which the code is to be changed. Served code 142 shows multiple different instances in which the code was transformed and served using the map 136. For example, an initial request for the code that led to the analysis by the box 126 may be served to client 148 or client 150 by replacing portions of the code identified by the map 136 with particular other selected strings, such as randomly-selected strings of characters. The next time that the code is requested, the box 126 may immediately recognize that the analysis of that web page and corresponding code has already been performed, and may simply apply the map 136 to a second serving of the code at 142. Such second serving may use other strings at the selected locations as compared to the first serving. Such a change in the code from serving to serving is a polymorphic coding that serves as a moving target for any malware that may attempt to interact with the code.

The box 126 may also seek a referral to an external analyzer system 128, instead of generating map 136, after generating map 136, or at the same time as generating map 136. Such a request may be made instead of generating a local map where (a) the box 126 has determined that it is currently unable to provide such analysis, for example, because it is currently running at a high load level; (b) because the box 126 simply does not provide any such analysis; or (c) because box 126 has identified portions of the code 124 that it is not capable of fully analyzing properly. In other situations, the box 126 may seek analysis assistance because it has determined that the relevant content is being accessed frequently by users (e.g., a threshold number of times or a threshold number of times in a determined time period) so that it would be useful to perform additional analysis on the content, or it or another subsystem have determined that malware or other sources are trying to interfere with the content, and additional tightening of the security on the content (e.g., through additional and deeper analysis) may be advisable. The box 126 may seek a referral after generating map 136 when a simple analysis is initially deemed appropriate, but later, additional analysis is deemed necessary. Such may occur when a web page is first requested a single time and later is requested many additional times—where the box 126 can determine that a relative lack of countermeasures on the code can be accepted for low-volume serving, but not for high-volume serving that includes higher risks of interaction with malware. The box 126 may seek a referral simultaneous with its own analysis of the code by sending the representation of the code to an external and remote server system while generating a map itself. When the external system responds, the box 126 may supplement its map with a map from the external system or may replace its map with a map from the external system.

The referral request is indicated in the figure by Arrow C, running from box 126 to external analyzer system 128. Such a request may take a variety of forms, and is shown in this example as including metadata 127A and web code 127B. The web code 127B may be the same as web code 124 or another representation of web code 124, such as a subset of web code 124 or other transformation that is being made to web code 124. The metadata 127A may also include a variety of information, including information describing preliminary analysis of the web code 124 that has been performed by the box 126, types of analysis that box 126 would like the external analyzer system 128 to perform, types of analysis the box 126 has or will perform (and perhaps the results of those analyses), and other relevant information.

Secondary security subsystem 130 is shown as including an aggregate data store 132, in addition to the external analyzer system 128. Secondary security subsystem 130 may typically include a number of additional components, including operator terminals by which trained professionals employed by the security services organization may assist in the operation of the system. However, here, the system is simplified to emphasize the availability of the aggregate data 132 to the external analyzer system 128. With such aggregate data 132, which may include data received from multiple customers of the security service organization, the external analyzer system 128 may perform relatively complex analyses for generating countermeasures for the code that it is sent. For example, the security services organization may have a number of different banking or retail clients, and thus may have exposure to a number of different manners in which login, purchase completion, and account transfer operations are carried out by various types of web code. The security services organization may have previously generated various forms of countermeasures for such types of pages and made observations about the effectiveness of such countermeasures. As a result, the external analyzer system 128 may use such knowledge in analyzing web code 127B to provide data for implementing the countermeasures determined to have been successful in such types web code.

Arrow D shows the external analyzer system returning, to the box 126 or related components, information that results from the analysis performed by the external analyzer system 128. In this example, the data includes metadata 134A and map data 1348 (indicated as MAP 2). The map data 1348 may identify locations in web code 124 at which changes are to be made in transcoding the web code 124 in order to introduce countermeasures into the web code 124, in addition to data indicating what form each of the countermeasures should take. In the examples provided above, the countermeasures may include changing the names of elements in the web code 124 in a different manner for each serving of the web code, where the changing of names of the elements does not affect the functionality of the web code for a user in any noticeable manner. As a result, the code that is served to two different users (or to the same user in different sessions) will be different although the user experience in executing the code will not be different.

The maps 136 and 138 may be used exclusively of each other, such that when map 138 is received by box 126, box 126 stops using map 136 and starts using map 138. Alternatively, the use of maps 136 and 138 may be additive, in that map 136 may be used to perform some of the alterations to trans-coded code, while map 138 may be used to perform other alterations. Also the map 138 may be merged with map 136 when it is made available. As shown in the figure, when map 138 is ultimately used to generate served code, that served code may be represented by multiple different versions of the served code as shown by item 144. In this instance, the representation shows servings of the code using map 138 to a variety of different requesting clients, such as client 148 and client 150, or to the same client across multiple sessions.

Examples of the alterations that are specified by map 136 and map 138 are shown below the representations of the maps in the figure, at items 140A—C. These items indicate, respectively, HTML code, JavaScript code, and CSS code (or other forms of web code) that may be served to client devices such as devices 148 and 150. Numbered boxes within the three examples of code represent locations in the code at which transcoding and alteration is to occur before the code is served. Numbers within the boxes represent common elements that are to be trans-coded in the same manner across all of the code so that the code does not break, such as where portions of the code reference other portions of the code. Thus, the HTML code 140 A and the JavaScript code 140B each have one instance of the element designated with the number one, whereas all three types of the code contain instances of the element designated with number three. The types of elements and the locations of those elements is represented graphically here to indicate that the maps 136 and 138 may specify both locations of elements in the resources that need to be changed, and the form of the changes that are to be performed on those elements.

Therefore, using system 120, a security service provider may efficiently and effectively add security countermeasures to code that is served by one of its customers, or a large organization may perform such services across its multiple web or other content properties using a centralized system to supplement distributed components in a larger system. The distributed components may perform a first level of analysis on the resources that are to be served, whereas the centralized components may perform a second level or type of analysis on such resources. The results of the analyses that each such level performs may then be combined and applied to the resources each time that they are subsequently served to requesting client devices, until the resources change sufficiently so as to require additional analysis and updating of the analysis maps.

Figure 2A:
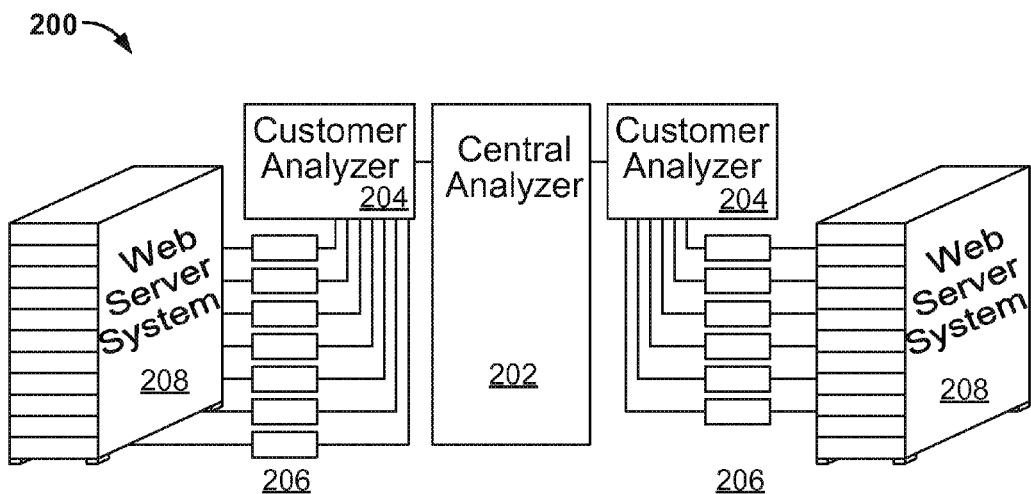
FIG. 2A is a schematic diagram showing a central system that performs code analysis for multiple distributed systems.

FIG. 2A is a schematic diagram showing a central system 200 that performs code analysis for multiple distributed systems. In general, the system 200 is represented in a highly simplified manner here to highlight the manner in which a system may operate at various levels and the manner in which the different levels may communicate with each other.

At the center of the system 200 is a central analyzer 202. Such central analyzer 202 may be operated by a security services organization that may sell or lease hardware and/or software to various customers, and also provide ongoing security services in the form of assistance in generating countermeasures and detections of security threats, such as in the form of malware operating on client devices with which server systems of the customers interact. Such malware may attempt to exploit the client devices and in turn to exploit the server systems so as to steal money or information from users of the client devices or operators of the server systems.

The central analyzer 202 is shown in simple form here for clarity but may include a number of various components including those shown for system 500 in FIG. 5 below. For example, the central analyzer 202 may include components for analyzing web code that has been provided to it by components at customer sites and to provide feedback on best methods for transcoding the web code, where the feedback may include templates, or maps, indicating where changes should be made and the character of each such change in the resources to be served by a customer from it server system. The central analyzer 202 may also include mechanisms for generating aggregate data that represents code served by multiple different customers, and the manner in which client devices react to such code. For example, central analyzer 202 may generate and provide instrumentation code that is piggybacked with the normal code served by a Web server system and that executes on client devices to monitor interaction with the regular code on such devices by third-party code (which may be benign or may be malware). The instrumentation code may report back to the central analyzer 202 or other components within a system operated by the security services organization with metadata that describes anomalous interaction with the ordinary code that was served from the server systems. The security services organization may use such information to identify new attacks that are being performed by malware, such as by identifying clustering in data that represents interaction with the served web code, particularly with web code from different customers of the organization where the web code attempts to perform similar activities such as login screens and transaction screens for retail and banking customers.

The central analyzer 202 may also include administrative terminals at which human employees of the security services organization work. Such employees may analyze data, such as the aggregate data, to help identify trends and effectiveness of particular countermeasures. In addition, such employees may assist the central analyzer 202 in performing analysis on particular code that is received from customers. For example, an automatic system operated by the central analyzer 202 may identify candidate elements within certain web code for receiving polymorphic transformation by the system 200, but may not have sufficient certainty about the operability of some of the transformations even though it may have certainty about the operability of other transformations. For the transformations for which there is uncertainty, the central analyzer 202 may highlight all instances in which a particular element occurs in the code to show a human employee such elements. From such information, the human employee can identify all such instances of the elements in the code and confirm whether a proposed change for the code suggested by the automatic analysis of the central analyzer 202 is indeed an appropriate change to be made in the code. Such human assisted content analysis may be used for all or only some of the submitted referrals for analysis that are provided to the central analyzer 202. Thus, in certain implementations, the multi-level analysis discussed in this document may be at a first level that is automatic, and a second level that is manual and performed by a human (or partially manual and partially automatic). Alternatively, the first level may be automatic, the second level may be automatic but more powerful (e.g., at a central analysis system that has access to more and better data for performing an analysis), and a third level may be manual or a mix of manual and automatic (e.g., if the automatic central analyzer 202 identifies analyses with which it needs human assistance and/or confirmation).

The central analyzer 202 in this example is shown communicating with a pair of customer analyzers 204. Such customer analyzers 204 may be implemented in the form of hardware and software that has been provided to the respective customers by the security services organization. Such hardware may include basic rack-mounted boxes that are physically connected between the customer's Web server system 208, and users who request information from the Web server system 208. In certain implementations, the customer analyzers 204 may in turn communicate with local managers 206 that operate at each Web server of the Web server systems 208. For example, each of the local managers 206 may perform insertions and substitutions in furtherance of polymorphic serving of the code by a particular server to a requestor, but may not perform any analysis in determining how such polymorphic substitution and insertion is to take place. Each such local manager 206, upon identifying new code to be served that it does not recognize as being an old version of code, may forward the code to its respective customer analyzer 204, which may in turn perform a light analysis of the code to determine whether local analysis is advised. If such analysis is advised, the local analyzer 204 may carry out such analysis, and may also forward a representation of the relevant web code to the central analyzer 202 for alternative or additional analysis to identify locations at which polymorphic transformations and insertions may be made to the code.

In this manner, then, the system 200 may employ multiple layers of components in a modular manner, so that each layer has a particular assigned function relative to the analysis of code for creation of maps or templates for use in polymorphic transcoding, and may pass code to another layer for analysis or other treatment that is appropriate for that particular receiving layer. In other implementations, more or fewer layers may be used. For example, in certain implementations, customer analyzer 204 and local managers 206 may be combined in a single physical and/or logical unit, such as in a single rack-mounted device operating one or more processor cores and threads.

Figure 2B:
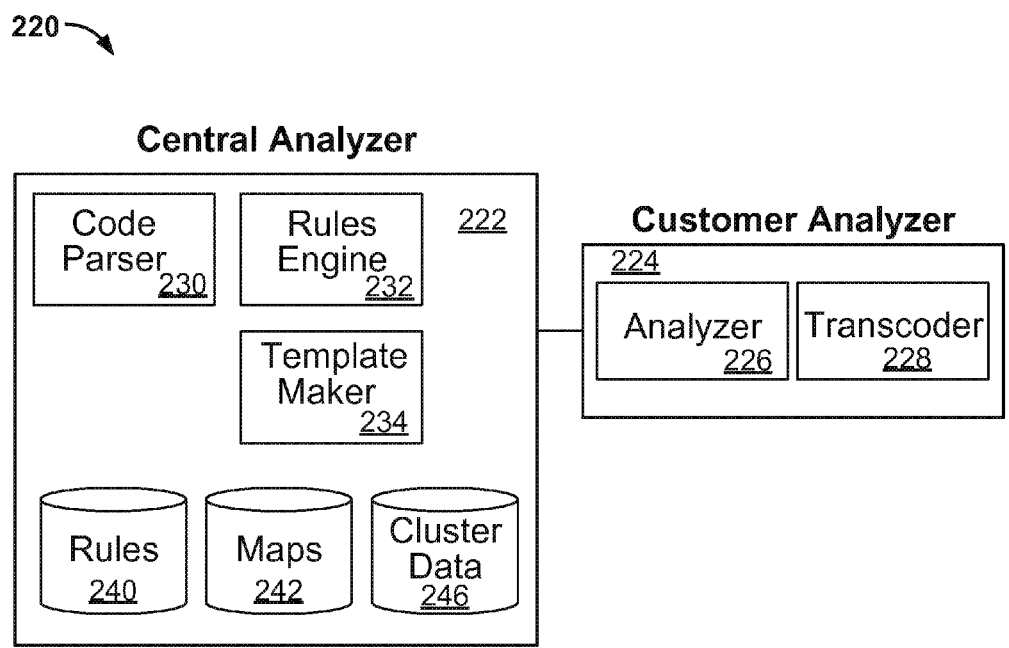
FIG. 2B is a schematic diagram showing example components of a central analyzer and a distributed analyzer.

FIG. 2B is a schematic diagram showing example components of a central analyzer 222 and a distributed customer analyzer 224. In general, the system 220 is similar to one branch of system 200 shown in FIG. 2A, though the present figure shows more detail of example components that may be provided in particular portions of the system.

The system 220 in this example is shown to include a central analyzer 222 and a customer analyzer 224. As described previously, the customer analyzer 224 may generally be physically located at a site of a customer's Web server system, such as in a physical data center along with other computer server systems operated by the customer. Such a customer may be any appropriate form of electronic content serving organization, such as a retailer or a bank that is interested in security of the interactions that it has with its customers. The content that is served may take a variety of forms, including web code that is served to web browsers and/or other code that is served to apps or applications executing on one or more client devices.

The customer analyzer 224 is shown, in this simplified representation, as having two main components—an analyzer 226 and a transcoder 228. The analyzer 226 performs analysis of resources that are to be served to client devices to insert countermeasures into the code, and also to determine whether additional analysis should be performed by another component, such as by central analyzer 222. The transcoder 228 uses analysis from analyzer 226 or from central analyzer 222 in order to make changes to the original code received from a Web server system of a customer into a form that the code may be served to a requesting client device, so as to impose security restrictions with the code. For example, the transcoder 228 may use a template received from analyzer 226 to make substitutions for particular strings within code to be served, and may make such substitutions in a different manner each time that the code is served in a manner that is consistent across each particular serving of the code. In this manner, the transcoder 228 may interfere with the ability of malware to interact with the code, since the code will be constantly changing from the viewpoint of any operating malware.

The central analyzer 222 includes a number of components for assisting in the analysis that is needed by the customer analyzer 224. For example, a code parser 230 is provided to step through code, such as clear text HTML, CSS, and JavaScript code, to identify particular elements within the code. The code parser 230 may be provided with a syntax for the particular type of code to help it identify relevant elements, such as particular tags that identify certain operations to be performed by the code. For example, particular HTML tags may be searched for in the code, and may then be identified in a map for substitution or other countermeasure operations when the code is served to users.

A rules engine 232 is consulted by the code parser 230 in order to identify such elements and to determine what actions to take with respect to such elements. For example, a particular coding element may be identified according to a known syntax for the code, and the rules engine 232 may be programmed with the knowledge that variation in such element of a particular type will not affect the functionality of the code when it is executed on a client device. The rules engine 232 may thus cause a change to be imposed upon such an element when it is found in the code—e.g., by causing the position of the element to be logged in a map or template, along with the type of element so that the change on the element can be implemented readily.

A template maker 234 may cause such changes to be implemented in a manner that can be carried out by transcoder 228 when it changes the code each time it serves the code. The template maker 234 may, for example, be programmed to search for particular elements such as particular tags or other pieces of code and content, to identify locations of such elements, types of the elements, and syntax for the elements, and to record related information for changing such elements in a polymorphic manner. Such operation may be guided by rules implemented by the rules engine 232. The data generated by the template maker 224 may take a variety of forms, such as an XML file or other file that may be used by other components to implement changes in the code specified by the template maker 234.

Various data stores may be accessed by the other components of the central analyzer 222 in carrying out the processes described above and below. For example, a rules database 240 may include rules and may be followed by the template maker 234 and accessed by the rules engine 232 in processing code and other content that is to be analyzed by the central analyzer 222. The rules may, in simple form, identify code elements that are to be located by the system, and may specify manners in which those elements are to be treated in generating a template or map for the provided code. Generally, the rules specify behavior that an analyzer is to take when it is presented with code of a particular type.

A maps database 242 may store general or specific maps, or templates, that define how code is to be recoded by a system. General maps may be generated to not correspond to a particular group of code, but to instead represent typical instances of code, and thus may be accessed and edited when a particular instance of code is received to be analyzed. In essence, such maps may serve as a template for a template. For example, each template that a system generates may have certain sections, headers, and other general information. A general map 242, or template, may be constructed in advance and include the basic outline of what a final map will need to contain. It may be built upon by the system when certain content is received for analysis, in order to generate a more specific map. For example, the central analyzer 222 may receive a number of files from the customer analyzer 224, may access a general map, and may fill in holes in the general map as part of the process of analyzing the code, so as to generate a specific map that corresponds to that particular code. In a manner, the general map is a template for the specific map.

Cluster data 246 may represent information aggregated across multiple groups of code that have been received by the central analyzer 222. For example, the central analyzer 222 may receive code from various different customers and may automatically, or with the assistance of human analysts, identify common themes, or clusters, in such code, along with identifying types of countermeasures that have been successful or unsuccessful when applied to such types of code. Therefore, the rules engine 222 may access the cluster data 246 to generate improved rules for analyzing content that is provided to the central analyzer 222. Such generation of improved rules may be essentially continuous, so that the central analyzer 202 learns over time from operations that it performs on content received from different customers. As noted above, the central analyzer 222 may anonymize such data for aggregating it and may perform other operations so as to maintain privacy for the data of particular customers.

Also, multiple different analysis techniques may be applied to a single piece of content or collection of content by the components shown here and by other components Such analyses may be applied by generating an intermediate representation of the content (e.g., a document object model, or DOM, from code for a web page), with the different analyses being applied in series or parallel with each other upon the same original content and/or intermediate representation. Such multi-part analysis may be particularly beneficial where the content implements multiple client-side technologies that the primary system can assembled from one or more logical HTTP transactions. Such particular analysis techniques that may be used either alone or in combination with any number of the other techniques (for any of the systems and methods described in this document), include: standard static analysis techniques; data flow analysis; partial execution of content/code; probabilistic execution of code; and other techniques. The techniques of analysis that a system selects to perform may result from the system determining the types of web technologies implicated by the code, and then addressing an analysis technique or techniques to the particular technology, and to other particular technologies determined to be implicated by the content.

Figure 3:
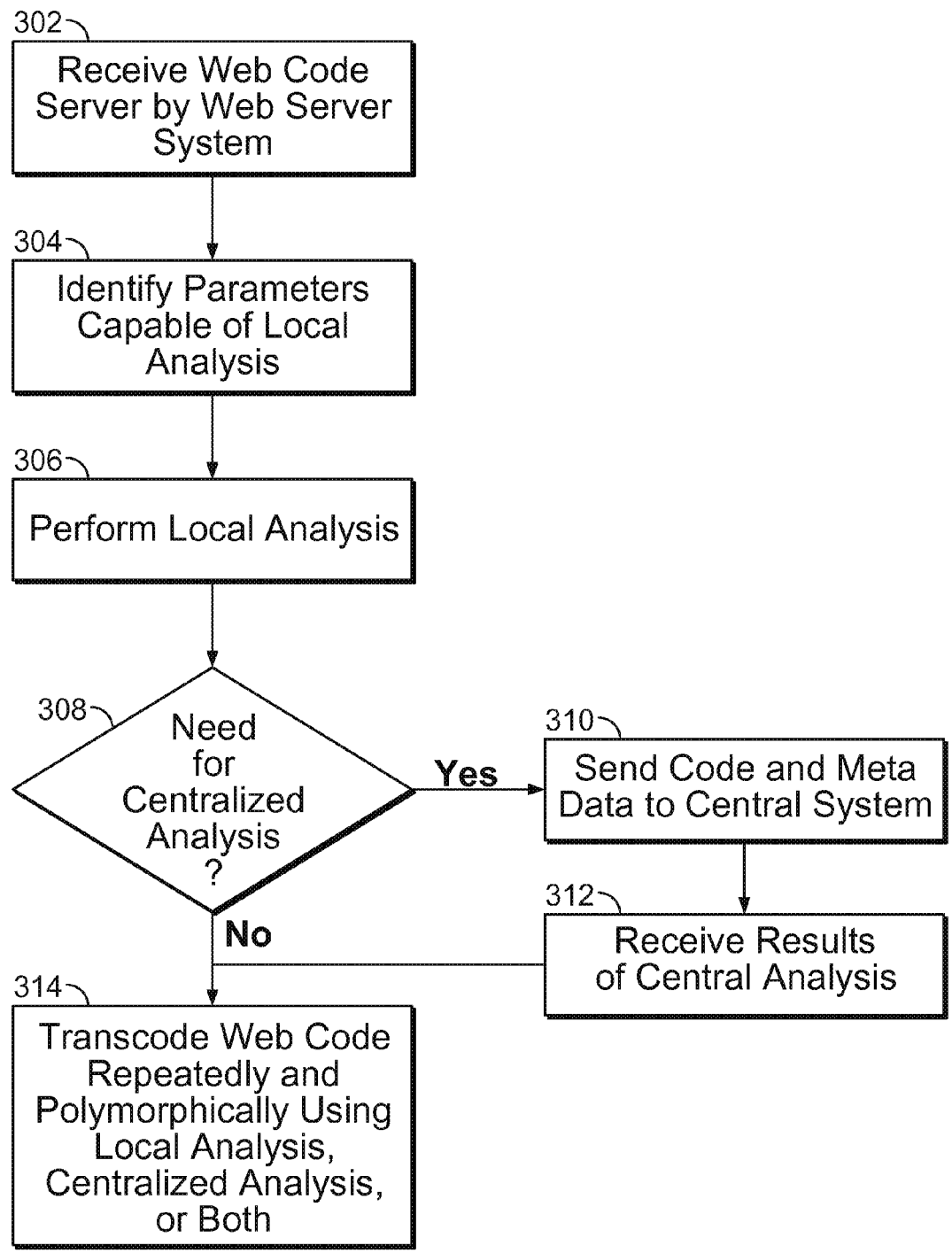
FIG. 3 is a flow chart of a process for processing code for analysis and polymorphic transcoding.

FIG. 3 is a flow chart of a process for processing code for analysis and polymorphic transcoding. In general, the process involves operations that may be performed by a primary analysis system in determining whether, and how, to refer analysis tasks to an external secondary analysis system that is separate from the primary analysis system. The process may be performed, for example, by systems like system 100 in FIG. 1A and system 120 in FIG. 1B, along with systems 200 and 220 in FIGS. 2A and 2B, respectively.

The process begins at box 302, where web code served by a Web server system is received. The web code may take a variety of forms and be a variety of web content, including but not limited to HTML code, CSS code, and JavaScript code. In a typical implementation, such multiple kinds of code may be related to each other and may be executed together by a web browser or other application in rendering an interactive presentation for a user of a client computing device. For example, HTML code may call certain JavaScript code or reference CSS code, certain JavaScript files may make reference to function or other names in other JavaScript code, and various other interdependencies in different files and different pieces of code may be made, and may need to be analyzed as part of this process.

As for physical implementation of such a step, the code may be received at an intermediary system that is operated by the same organization that operates the Web server system or other sort of server system that initially serves the code. For example, the intermediary may be one or more pieces of hardware and/or software physically cabled between a public network such as the Internet and the Web server system that initially serves the code. As such, the intermediary may receive requests directed to the Web server system and also receive responses from the Web server system, and may act to transcode and analyze all or some of such communications before passing them on to the intended recipient.

At box 304, the process identifies components in the received code that are capable of local analysis. Such local analysis is contrasted to secondary analysis that may be performed by different hardware and software, typically in a different location and by hardware and software that is shared across many different server systems in addition to the system that served the particular web code at box 302. The identification of such components may take a simple form, such as by simply identifying known code elements that are understood to require specialized analysis, or for being susceptible to specialized analysis, that is not currently available from the primary analysis system. In more complex implementations, the identification may involve identifying particular combinations of elements, particular coding styles, particular programming languages or combinations of programming languages that are used, and particular programming techniques that are used, such as by a system considering AJAX programming styles to require more complex analysis, as just one example.

At box 306, the local system performs a local analysis, if it has determined that such analysis is advisable. For example, the local system may determine that certain simple names of elements in the code can be changed without affecting the functionality of the code for users, and that such changes can be made easily across the entire code base by simply searching for common names and making consistent replacements for them. In such a situation, the local analysis may involve simply searching for a particular type of element, identifying a name that the programmer has applied for that element, and searching for the same name throughout the code that is to be served, while ensuring that the name is not used in multiple different ways in such code. The analysis may further include identifying all locations at which the particular name was found in the code, and generating an entry in a template that lists each instance of a location, along with an indication of the change that is to be made at each of those locations, such as the replacement of the name with a particular random generated string. Such an analysis process may be repeated for all such simple elements identified in a set of rules for performing the analysis, so that a multi-parameter template, or map, is generated at the local system for future use in transcoding the code that is to be served to users.

At box 308, the process makes a determination about whether a need for centralized analysis is present for the code. Such a determination may be made before the local analysis is performed or while the local analysis is occurring. The need for centralized analysis may be triggered based on a variety of factors, either alone or in combination. For example, centralized analysis may be determined to be necessary if a particular type of element is found in the code (e.g., an element that is known to require complex analysis or to be better analyzed and altered if aggregated data from multiple customers is available). Alternatively, or in addition, centralized analysis may be required based on a programmer including a key in the code that is explicitly directed toward triggering centralized analysis. For example, a customer that produces the code may train its programmers to identify particular web pages that they believe require the additional, and potentially more sophisticated, analysis provided by a centralized analysis system. Such programmers, or automated programming environments, may add comments or other sorts of tags that are formatted in a particular manner and designed to be recognized by a system executing the process described here. As another example for identifying when centralized analysis is needed, the system may keep a count of the number of times a particular webpage is requested and may trigger centralized analysis when that count exceeds a particular number of requests or a particular number of requests in a particular time period. For example, an assumption may be made that unpopular webpages are less at risk of malware attack than are more popular webpages, so that additional centralized analysis is triggered only for those webpages determined to be susceptible of higher risk of malware attack.

If a need for centralized analysis is determined to be present, the code and related metadata may be sent to a central system that performs such analysis, as indicated by box 310. The code that is sent may be identical to the code that is received from the Web server system or may be another form of representation of the code. For example, to reduce transmission overhead, the initial processing system may remove comments or other sections of the code determined to be unnecessary for performing the centralized analysis. The metadata may take a variety of forms and provide the centralized system with information that it needs to properly perform its analysis. For example, the metadata may identify what analysis is being performed by the primary system, so that the centralized system does not repeat such analysis unnecessarily. The metadata may also identify the type of analysis that the centralized system is being asked to perform. For example, a security services organization may publish an API that identifies a menu of analysis services that its centralized system can provide, and the local devices may be programmed to selectively identify particular ones of those types of analyses when they submit the code for analysis, such as by including a number in a particular field of the metadata that corresponds to the desired type of analysis.

At box 312, the local primary system receives the results of the centralized analysis. Such results may include a map, or template, that is similar to the map or template generated by the primary system but that includes results of the centralized analysis. The results may also include other forms of information, such as indicators of the confidence that the secondary system has in the analysis (e.g., a flag or score that may be overridden). The information may also describe the situations over which the analysis will be valid, e.g., to assist the primary system in determining when certain changes made to the content might require a re-analysis of the content so as to make sure that the recoded code does not break when it is served.

At box 314, the web code is trans-coded repeatedly and polymorphically using the local analysis, the centralized analysis, or both. For example, in some implementations, the local analysis may be considered inferior, and may only be used until the centralized analysis is received, at which case it can be fully replaced by the map for the centralized analysis. In other instances, the centralized analysis may be appended to the localized analysis either physically by adding the two together to create a new map or template, or procedurally by having a transcoder use the local analysis map to transcode the content, and then use the centralized analysis map to further transcode the content. In this manner, then, the process can permit basic transcoding for a time (or no transcoding for a time), and then more advanced transcoding after that.

Figure 4:
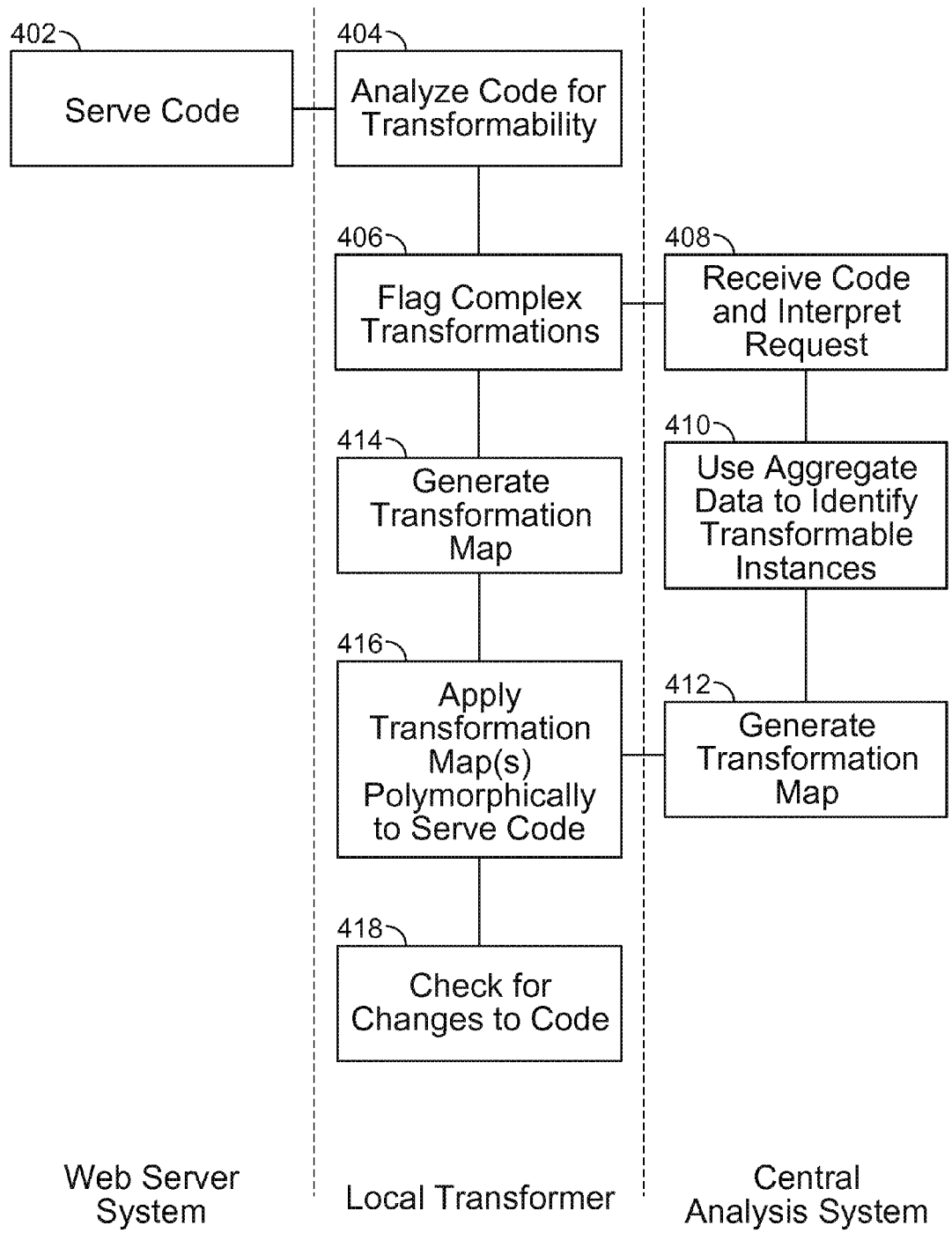
FIG. 4 is a swim lane diagram of a process for processing code for analysis and polymorphic transcoding.

FIG. 4 is a swim lane diagram of a process for processing code for analysis and polymorphic transcoding. In general, the process shown here is similar to that discussed above for FIG. 3, though additional detail is provided with respect to particular components that perform particular operations within the process.

The process begins at box 402, where a Web server system serves code to a local transformer system. Such serving of code may occur in various appropriate manners, including those discussed in more detail above. The serving of code may be made through a local area network and high-speed connection, or over a wide area network where latency from such network is not a concern for the proper operation of the process.

At box 404, the local transformer system, which may be at a same site as the Web server system, analyzes the code to determine its transformability. Such analysis is described in various manners above, such as by a parsing of the code to identify what coding elements are included in the code, and whether such elements are of a form that can be easily analyzed and transformed by a system without interfering with the functionality of the code for a user. For example, certain function names or other object names may be transformed into other names without affecting functionality, as long as such transformations are performed consistently across the code so that the code does not break. Also, the transformation into a new name may be different each time the code is served, so as to provide for polymorphic serving of the code, so that the code is different each time it is received by the same or different computing device, and so that malware executing on such computing devices will have to chase a moving target in terms of the names of functions or other objects that are changing constantly over time via the transcoding of the code.

At box 406, the local transformer system flags complex transformations to which the code is susceptible. For example, the local transformer system may identify particular coding elements that do not simply involve name changes across the code but instead have, perhaps, multi-layered effects in the code when they are changed. For such complex transformations, the local transformer may refer the transformation analysis to a central analysis system, which may receive such code and interpret the request from the local transformer system as shown at box 408. At this stage in the process, then, parallel analysis may be occurring at the local transformer system and the central analysis system.

At the local system, as shown at box 414, the system generates a transformation map. Such a map may be based solely off of information that the local transformer system knows from its own local Web server system, such as only based on rules that have been provided to it and the code that has been provided to it. In similar manner, the central analysis system generates a transformation map at box 412, though after using aggregate data to identify transformable instances in the code, as shown at box 410. In particular, the central analysis system may have additional processing power and additional data available to it for performing such analysis (as compared to the local system), including data from various distributed systems of various different customers and organizations that serve different types of code and have different sorts of security issues from different attackers. Such analysis by the central analysis system may thus be relatively more robust than that performed by the local transformer system.

The two transformation maps, from the local system and the central system, are then combined and applied at box 416. There, the local transformer system may use the same hardware components or different hardware components to take the received code, apply the map or maps to it, and to generate a trans-coded version of the received code that includes countermeasures directed toward stopping malware interference with the code. As discussed above, the particular form of the code may differ for each serving of the code, as the map is used to apply changes to the code in a different manner for each serving.

At box 418, the local transformer system checks for changes to the code. Such a check may be performed each time code is received from the Web server system, so that out-of-date maps are not used to transform the code, which may result in breaking the code or serving code to users that does not match what the customer intended the users to receive. The check for changes to the code at box 418 may be performed by looking for a perfect match between previously received instances of the code and subsequently received instances of the code, or by making hashes of each version (or other compressed representations of them) and comparing the two hashed versions. However, certain code is dynamic and changes every time it is served, so the check may also exclude such dynamic portions of the code. Alternatively, or in addition, the check may be limited to portions of the code that were identified as being subject to polymorphic treatment by prior analyses, so that the check may refer to the map and locations identified by the map to determine whether a relevant portion of the code is changed or not. If a relevant portion of the code has changed, the analysis described in the previous steps may be repeated for the new changed code. If no relevant portion of the code is determined to have changed, the transcoding using prior analysis may be applied to the code, any trans-coded version of the code may be served.

In this manner, two sub-systems that are located remotely from each other may cooperate to perform analysis on resources that are to be served to various client devices as a means to applying polymorphic transformations or other countermeasures to the resources. One sub-system may identify a need for analysis of the code and may also optionally perform certain levels of analysis. The second sub-system (or additional sub-systems) can perform additional analysis, and typically more complex analysis in terms of computational load or need for available data to perform the analysis.

Figure 5:
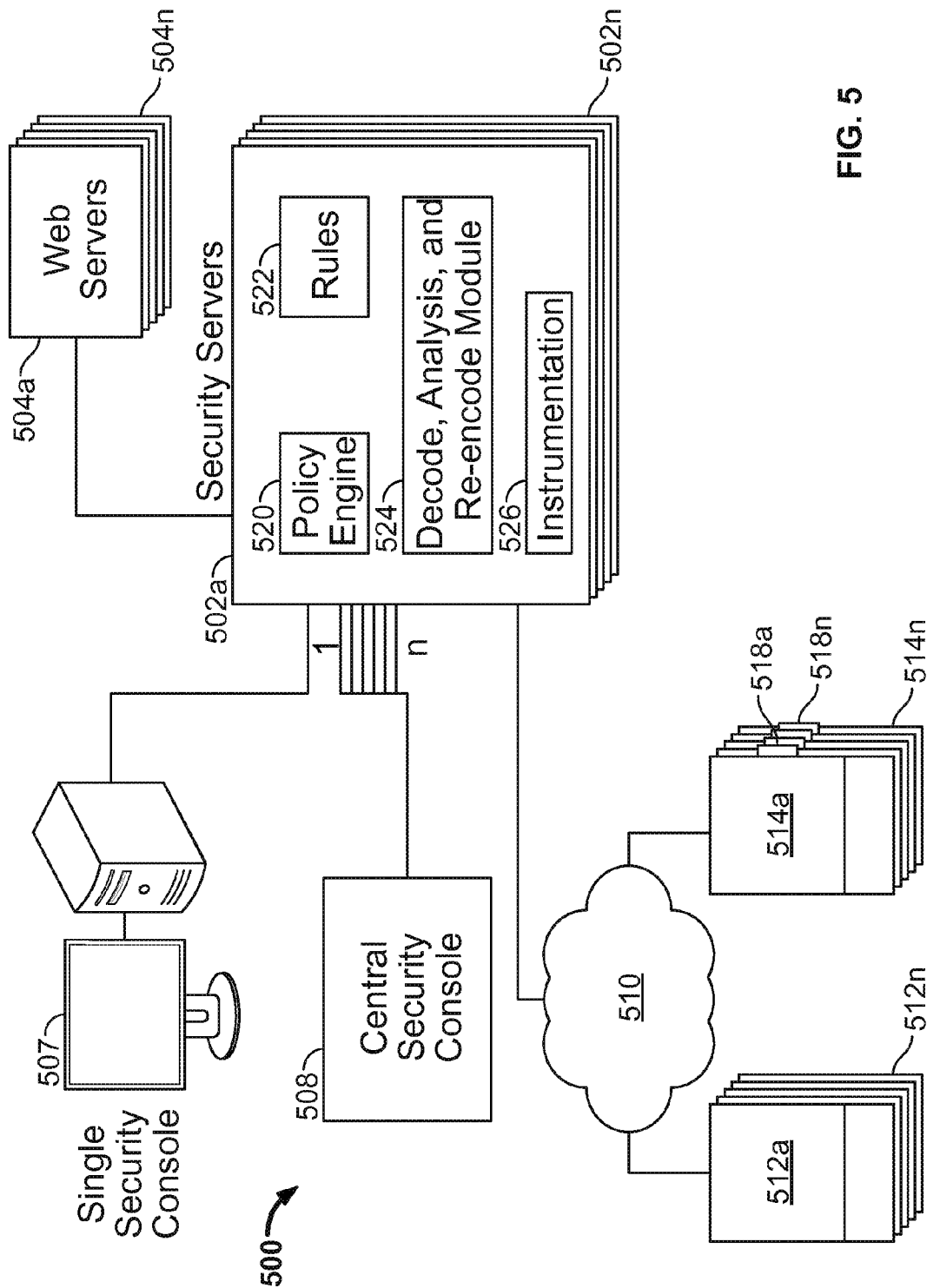
FIG. 5 shows a system for serving polymorphic and instrumented code.

FIG. 5 shows a system for serving polymorphic and instrumented code. Generally, and as explained above, polymorphic code is code that is changed in different manners for different servings of the code in manners that do not affect the manner in which the executed code is perceived by users, so as to create a moving target for malware that tries to determine how the code operates, but without changing the user experience. Instrumented code is code that is served, e.g., to a browser, along with the main functional code and that monitors how the functional code operates on a client device, and how other code may interact with the functional code and other activities on the client device. The instrumented code may report back such activity to a security service that may then take action to intervene with the particular client and/or to develop countermeasures for other clients in the future.

The system 500 may be adapted to perform deflection and detection of malicious activity with respect to a web server system. Deflection may occur, for example, by the serving of polymorphic code, which interferes with the ability of malware to interact effectively with the code that is served. Detection may occur, for example, by adding instrumentation code (including injected code for a security service provider) that monitors activity of client devices that are served web code.

The system 500 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 504a to 504n, and could include a broad array of web servers, content servers, database servers, financial servers, load balancers, and other necessary components (either as physical or virtual servers).

In this example, security server systems 502a to 502n (which may implement components like those described in the systems of the figures above) may cause code from the web server system to be supplemented and altered. In one example of the supplementation, code may be provided, either by the web server system itself as part of the originally-served code, or by another mechanism after the code is initially served, such as by the security server systems 502a to 502n, where the supplementing code causes client devices to which the code is served to transmit data that characterizes the client devices and the use of the client devices in manners like those discussed in the many examples above. As also described below, other actions may be taken by the supplementing code, such as the code reporting actual malware activity or other anomalous activity at the client devices that can then be analyzed to determine whether the activity is malware activity.

The set of security server systems 502a to 502n is shown connected between the web servers 504a to 504n and a network 510 such as the internet. Although both extend to n in number, the actual number of sub-systems could vary. For example, certain of the customers could install two separate security server systems to serve all of their web server systems (which could be one or more), such as to provide greater bandwidth of processing and/or redundancy purposes. The particular security server systems 502a to 502n may be matched to particular ones of the web server systems 504a to 504n, or they may be at separate sites, and all of the web servers for various different customers may be provided with services by a single common set of security servers 502a to 502n (e.g., when all of the server systems are at a single co-location facility so that bandwidth issues are minimized).

Each of the security server systems 502a to 502n may be arranged and programmed to carry out operations like those discussed above and below and other operations. For example, a policy engine 520 in each such security server system may evaluate HTTP requests from client computers (e.g., desktop, laptop, tablet, and smartphone computers) based on header and network information, and can set and store session information related to a relevant policy. The policy engine 520 may be programmed to classify requests and correlate them to particular actions to be taken to code returned by the Web server systems before such code is served back to a client computer. When such code returns, the policy information may be provided to a decode, analysis, and re-encode module 524, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 502a to 502n, such as by the security servers 502a to 502n implementing a web crawler (not shown) to recursively search for new and changed content and to report such occurrences to the security servers 502a to 502n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 522 may store analytical rules for performing such analysis and for re-encoding of the content. The rules engine 522 may be populated with rules developed through operator observation of particular content types, such as by operators of a system studying typical web pages that call JavaScript content and recognizing that a particular method is frequently used in a particular manner. Such observation may result in the rules engine 522 being programmed to identify the method and calls to the method so that they can all be grouped and re-encoded in a consistent and coordinated manner.

The decode, analysis, and re-encode module 524 may perform certain of the analysis itself and may refer other analysis to a separate sub-system within the system 500, such as a remote sub-system (not shown). Such additional analysis may be performed more effectively or efficiently by the remote sub-system, such as if that system has higher gross computing power than does the module 524 (e.g., computing power shared across a number of different organizations), better analysis algorithms, and/or access to more complete data, such as data from across multiple different organizations that thus has greater diversity in the type of code that is served and the types of attacks that such code may be subject to.

The decode, analysis, and re-encode module 524 encodes content being passed to client computers from a web server according to relevant policies and rules. Such policies and rules may be implemented for particular resources by analyzing those resources and generating a template or map for the content that can be referenced repeatedly each time the same resources are requested by a different user. The module 524 also reverse encodes requests from the client computers to the relevant web server or servers. For example, a web page may be served with a particular parameter, and may refer to JavaScript that references that same parameter. The decode, analysis, and re-encode module 524 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 502 along with an identifier for the particular client computer so that the system 502 may know which key or function to apply, and may otherwise maintain a state for the client computer and its session. A stateless approach may also be employed, whereby the system 502 encrypts the state and stores it in a cookie that is saved at the relevant client computer, or in a hidden field such as a field on a form that is being presented to a user and for which the input to the form is being obfuscated in a polymorphic manner. The client computer may then pass that cookie data back when it passes the information that needs to be decoded back to its original status. With the cookie data, the system 502 may use a private key to decrypt the state information and use that state information in real-time to decode the information from the client computer. Such a stateless implementation may create benefits such as less management overhead for the server system 502 (e.g., for tracking state, for storing state, and for performing clean-up of stored state information as sessions time out or otherwise end) and as a result, higher overall throughput.

The decode, analysis, and re-encode module 524 and the security server system 502 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client- or session-specific. The decode, analysis, and re-encode module 524 may be adapted to apply different modifications to each instance/serving of a common web resource, or common portion of a web resource, such that the web code that it is ultimately delivered to the client computers in response to each request for the common web resource includes different modifications.

In certain implementations, the analysis can happen a single time for a plurality of servings of the code in different recoded instances (or once at a first level and once at a higher level for a plurality of servings of code). For example, the analysis may identify a particular function name and all of the locations it occurs throughout the relevant code, and may create a map to each such occurrence in the code. Subsequently, when the web content is called to be served, the map can be consulted and random strings may be inserted in a coordinated matter across the code, though the generation of a new name each time for the function name and the replacement of that name into the code, will require much less computing cost than would full re-analysis of the content. Also, when a page is to be served, it can be analyzed to determine which portions, if any, have changed since the last analysis, and subsequent analysis may be performed only on the portions of the code that have changed.

Even where different modifications are applied in responding to multiple requests for a common web resource, the security server system 502 can apply the modifications in a manner that does not substantially affect a way that the user interacts with the resource, regardless of the different transformations applied. For example, when two different client computers request a common web page, the security server system 502 applies different modifications to the web code corresponding to the web page in response to each request for the web page (though perhaps using a single map, or template), but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices, or in different sessions in which the resource is requested.

An instrumentation module 526 is programmed to add instrumentation code to the content that is served from a web server. The instrumentation code is code that is programmed to monitor the operation of other code that is served. For example, the instrumentation code may be programmed to identify when certain methods in that base content are called, and when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 502 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 502, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 504a to 504n, as encoded by decode, analysis, and re-encode module 524, may be rendered on web browsers of various client computers. Uninfected client computers 512a to 512n represent computers that do not have malicious code programmed to interfere with a particular site a user visits or to otherwise perform malicious activity. Infected client computers 514a to 514n represent computers that do have malware or malicious code (518a to 518n, respectively) programmed to interfere with a particular site a user visits or to otherwise perform malicious activity. In certain implementations, the client computers 512a to 512n, 514a to 514n may also store the encrypted cookies discussed above and pass such cookies back through the network 510. The client computers 512a to 512n, 514a to 514n will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 512a to 512n, 514a to 514n. For small-scale analysis, each web site operator may be provided with a single security console 507 that provides analytical tools for a single site or group of sites. For example, the console 507 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 507 may also be multiple different consoles used by different employees of an operator of the system 500, and may be used for pre-analysis of web content before it is served, as part of determining how best to apply polymorphic transformations to the web code. For example, in combined manual and automatic analysis like that described above, an operator at console 507 may form or apply rules 522 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 508 may connect to a large number of web content providers, and may be run, for example, by an organization that provides the software for operating the security server systems 502a to 502n. Such console 508 may access complex analytical and data analysis tools, such as tools that identify clustering of abnormal activities across thousands of client computers and sessions, so that an operator of the console 508 can focus on those clusters in order to diagnose them as malicious or benign, and then take steps to thwart any malicious activity.

In certain other implementations, the console 508 may have access to software for analyzing telemetry data received from a very large number of client computers that execute instrumentation code provided by the system 500. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 508 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 500, may be blocked from interaction, or may have their operators notified that their computer is potentially running malicious software (e.g., by sending an e-mail to an account holder of a computer so that the malicious software cannot intercept it easily).

Although the security server system 502a-n is shown here as an adjunct to the web servers 504a-n, such security server system 502a-n may be employed by other entities in a broader content delivery network, such as by Internet Service Providers (ISPs), large corporations serving their own employee networks, server systems that organizations provide to ISPs to lessen network traffic for high volume services, and the like.

Such systems may be deployed on the client side of the Internet (between the main Internet network and the end users), and may transcode content that has not been transcoded or may transcode content that already has been transcoded one or more times. For example, a downstream system may change the same variable names to a second random name that were previously changed to a first random name by a security system 512a-n operated by a company that served the content. Because both systems may reverse transcode responses from users, the second transcoding may be made invisible to the upstream security system and both transcodings may be made invisible to the original server system. Such "client-side" transcoding may allow an ISP or operator of a network for a large organization to protect the Internet from malware, and thus lessen its own need to carry malicious traffic, and also to identify what subscribers or other users of its system are likely to be harboring malware (whether intentionally or unintentionally). Also, in certain implementations, a publisher of content may provide examples of its servers at certain select high-volume ISPs, so that the original serving of code and the transcoding of the code for the publisher occurs at the ISP on the client-side of the internet.

Figure 6:
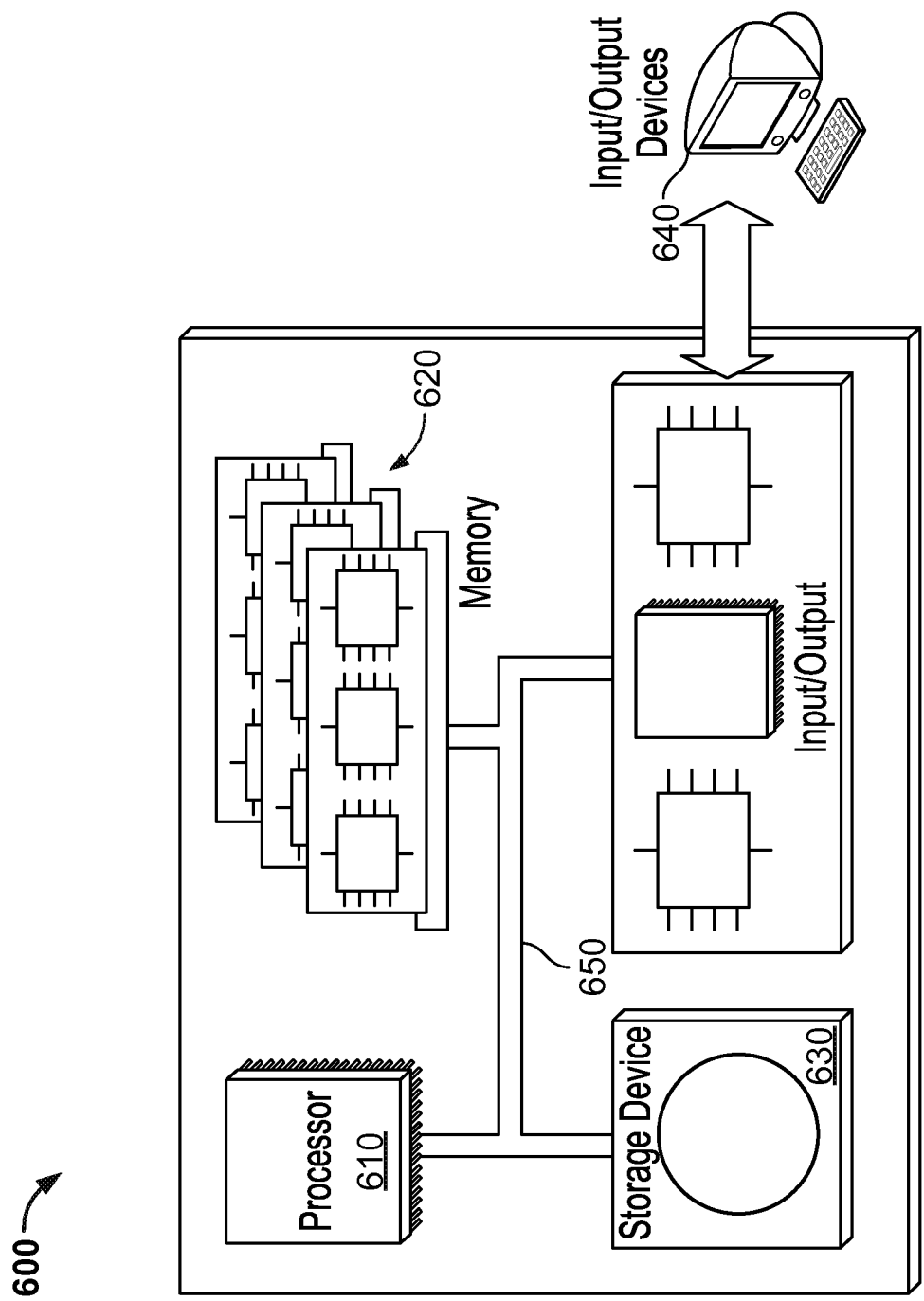
FIG. 6 shows an example computer system.

FIG. 6 shows an example of a computer system 600. The system 600 can be used for the operations described in association with any of the computer-implement methods described previously, according to one implementation. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, at a primary security sub-system that protects a web server system, from the web server system, code for generating a web page to be served to one or more computing devices that requested the code;
   forwarding, from the primary security sub-system to a secondary security sub-system that is remote from the primary security sub-system, the code for the web page that was received from the web server system;
   receiving, from the secondary security sub-system, a template created from analysis of the representation of the code for generating the web page that indicates changes to be made to the code for generating the web page and locations of the changes;
   wherein the template includes instructions for one or more polymorphic transformations that modify instances of code served, in response to different requests, in different manners without changing the function of the code served in response to the different requests;
   transforming the code for generating the web page using the template received from the secondary security sub-system before the code for generating the web page is served to the one or more computing devices.

2. The computer-implemented method of claim 1, further comprising, before forwarding the representation of the code for generating the web page from the primary security sub-system, determining whether to forward the representation of the code for generating the web page based at least in part on an initial analysis by the primary security sub-system of the code for generating the web page.

3. The computer-implemented method of claim 2, wherein the initial analysis comprises determining that analyses for types of transformations for the code for generating the web page are more effectively performed by the secondary security subsystem than by the primary security sub-system.

4. The computer-implemented method of claim 2, wherein the initial analysis comprises determining whether the code for generating the web page is requested sufficiently frequently by users, and forwarding the representation of the code for generating the web page in response to determining that the code is requested sufficiently frequently.

5. The computer-implemented method of claim 2, wherein the initial analysis comprises determining whether the code for generating the web page is susceptible to introduction of security countermeasures that the primary security sub-system cannot introduce without assistance from the secondary security sub-system.

6. The computer-implemented method of claim 1, wherein the primary security sub-system comprises hardware and software operated within a network of an organization that serves the code for generating the web page, and the secondary security sub-system comprises a server system operated by a security services organization for which the organization that serves the code for generating the web page is one of a plurality of customers that receive templates generated by the secondary security sub-system in response to analyzing code from respective ones of the plurality of customers.

7. The computer-implemented method of claim 6, wherein the template is generated using information from organizations other than an organization that generated the code for generating the web page.

8. The computer-implemented method of claim 1, further comprising
providing code for generating the web page to particular ones of the one or more computing devices by replacing content in the code for generating the web page at places identified by the template,
wherein the replacing differs as between different instances in which the code for generating the web page is provided to the particular ones of the computing devices.

9. The computer-implemented method of claim 1, further comprising supplementing the code for generating the web page with instrumentation code arranged to execute on a particular requesting computing device, wherein the instrumentation code, when executed on the particular requesting computing device, monitors interactions with the code at the requesting computing device and reports occurrences of anomalous activity on the particular requesting computing device.

10. The computer-implemented method of claim 1, further comprising serving to a particular requesting computing device, instrumentation code with a transcoded version of the code for generating the web page, wherein the instrumentation code, when executed on the particular requesting computing device, monitors interactions with the code for generating the web page at the requesting computing device and sends one or more communications to a server system to report occurrences of anomalous activity on the particular requesting computing device.

11. A computer-implemented data security system, comprising:
one or more first computing devices comprising:
one or more first hardware processors;
one or more first memory coupled to the one or more first hardware processors and storing one or more instructions, which when executed by the one or more first hardware processors, cause the one or more first hardware processors to:
receive, from a web server, data to be served to client computing devices;
evaluate the data to determine a need for assistance to alter electronic web page resources before the electronic web page resources are served to the client computing devices without affecting functionality of the electronic web page resources;
in response to determining a need for assistance, forward data that corresponds to the electronic web page resources to one or more second computing devices that are located remotely from the one or more first computing devices;
receive, from one or more second computing devices, a template comprising instructions for one or more polymorphic transformations that modify instances of code served, in response to different requests, in different manners without changing the function of the code served in response to the different requests;
altering the electronic web page resources in accordance with the template before serving the electronic web page resources to the client computing devices;
the one or more second computing devices comprising:
one or more second hardware processors;
one or more second memory coupled to the one or more second hardware processors and storing one or more instructions, which when executed by the one or more second hardware processors, cause the one or more second hardware processors to:
analyze the electronic web page resources;
generate one or more templates for altering the electronic web page resources without affecting the functionality of the electronic web page resources to create countermeasures against malware interaction with the electronic web page.

12. The computer-implemented system of claim 11, wherein the one or more first computing devices are programmed to, before forwarding a representation of the electronic web page resources, determine whether to forward the representation of the electronic web page resources based at least in part on an initial analysis of code for the electronic web page resources by the primary security sub-system.

13. The computer-implemented system of claim 11, wherein identifying a need for assistance comprises determining that analyses for types of transformations for the electronic web page resources are more effectively performed by the second computing devices than by the first computing devices.

14. The computer-implemented system of claim 11, wherein identifying a need for assistance comprises determining whether the electronic web page resources are requested sufficiently frequently by users.

15. The computer-implemented system of claim 11, wherein identifying a need for assistance comprises determining whether the electronic web page resources are susceptible to introduction of security countermeasures that the first computing devices cannot introduce without assistance from the second computing devices.

16. The computer-implemented system of claim 11, wherein:

the computing devices comprise hardware and software operated within a network of an organization that serves the electronic web page resources, and the second computing devices comprise a server system operated by a security services organization for which the organization that serves the electronic web page resources is one of a plurality of customers that receive templates generated by the server system in response to analyzing electronic web page resources from respective ones of the plurality of customers.

17. The computer-implemented system of claim 16, wherein the templates are generated using information from organizations other than an organization that generated the electronic web page resources.

18. The computer-implemented system of claim 11, wherein:

the sub-system containing the first computing devices is programmed to provide the electronic web page resources to the client devices by replacing content in the electronic web page resources at places identified by the templates, and the replacing differs, using a common template, as between different instances in which the electronic web page resources are provided to particular client devices.

19. The computer-implemented system of claim 11, wherein the first computing devices are further programmed to supplement the electronic web page resources with instrumentation code arranged to execute on a particular requesting computing device, wherein the instrumentation code, when executed on the particular requesting computing device, monitors interactions with the code at the requesting computing device and reports occurrences of anomalous activity on the particular requesting computing device.

20. The computer-implemented system of claim 19, wherein the subsystem containing the first computing devices is programmed to serve the instrumentation code with a transcoded version of the electronic web page resources created by applying the received templates to the electronic web page resources.

\* \* \* \* \*